(12) United States Patent
Pratt et al.

(10) Patent No.: US 10,630,510 B2
(45) Date of Patent: Apr. 21, 2020

(54) SPACE-POLARIZATION MODULATED COMMUNICATIONS

(71) Applicant: University of Notre Dame du Lac Office of Technology Transfer, Notre Dame, IN (US)

(72) Inventors: Thomas Pratt, Niles, MI (US); Robert Daniel Kossler, South Bend, IN (US); Benjamin Strycker, South Bend, IN (US); Jeffrey G. Mueller, South Bend, IN (US)

(73) Assignee: UNIVERSITY OF NOTRE DAME DU LAC, South Bend, IN (US)

( * ) Notice: Subject to any disclaimer, the term of this patent is extended or adjusted under 35 U.S.C. 154(b) by 0 days.

(21) Appl. No.: 15/134,381

(22) Filed: Apr. 20, 2016

(65) Prior Publication Data

US 2017/0054583 A1  Feb. 23, 2017

Related U.S. Application Data

(60) Provisional application No. 62/150,127, filed on Apr. 20, 2015, provisional application No. 62/158,954, (Continued)

(51) Int. Cl.
*H04L 25/02* (2006.01)
*H04B 7/06* (2006.01)
(Continued)

(52) U.S. Cl.
CPC ....... *H04L 25/0204* (2013.01); *H04B 7/0626* (2013.01); *H04L 1/0041* (2013.01);
(Continued)

(58) Field of Classification Search
CPC ...... H04B 10/532; H04B 7/0413; H04B 7/06; H04B 14/008; H04B 14/08; H04B 7/10;
(Continued)

(56) References Cited

U.S. PATENT DOCUMENTS

| | | |
|---|---|---|
| 2,273,911 A | 2/1942 | Usselman |
| 2,357,439 A | 9/1944 | Usselman |

(Continued)

OTHER PUBLICATIONS

Andrews et al., "Tripling the Capacity of Wireless Communications Using Electromagnetic Polarization", Letters to Nature, Jan. 18, 2001, vol. 409, No. 6818, pp. 316-318.

(Continued)

*Primary Examiner* — Betsy Deppe
(74) *Attorney, Agent, or Firm* — Knobbe, Martens, Olson & Bear, LLP

(57) ABSTRACT

Methods and systems relating to topics in space-polarization modulated communications. The topics include: adaptive space-polarization modulated communications using channel state information at the transmitter; adaptive decision boundaries at the receiver; carrier frequency offset estimation for multi-carrier modulation schemes; transmission of analog images using polarization and coherence dispersion information; and reduction of peak-to-average power ratio in multi-carrier modulation schemes.

2 Claims, 24 Drawing Sheets

Related U.S. Application Data filed on May 8, 2015, provisional application No. 62/325,436, filed on Apr. 20, 2016.

(51) Int. Cl.
  *H04B 10/532* (2013.01)
  *H04L 27/26* (2006.01)
  *H04L 1/00* (2006.01)

(52) U.S. Cl.
  CPC ........ *H04L 25/022* (2013.01); *H04L 25/0228* (2013.01); *H04L 27/2621* (2013.01); *H04L 27/2657* (2013.01); *H04L 27/2672* (2013.01); *H04L 27/2676* (2013.01)

(58) Field of Classification Search
  CPC ............... H04L 25/0202; H04L 25/022; H04L 25/0204; H04L 27/34; H04L 1/0041
  See application file for complete search history.

(56) References Cited

U.S. PATENT DOCUMENTS

| | | | |
|---|---|---|---|
| 2,992,427 | A | 7/1961 | Franco |
| 5,299,047 | A | 3/1994 | Kasturia et al. |
| 5,943,372 | A | 8/1999 | Gans et al. |
| 7,933,343 | B2 | 4/2011 | Emami et al. |
| 9,325,436 | B2 | 4/2016 | Pratt et al. |
| 10,264,525 | B2 | 4/2019 | Pratt et al. |
| 10,270,547 | B2 | 4/2019 | Pratt et al. |
| 10,280,787 | B2 | 5/2019 | Pratt et al. |
| 2004/0264592 | A1* | 12/2004 | Sibecas ................... H01Q 21/24 375/267 |
| 2010/0003034 | A1* | 1/2010 | Pratt ........................ H04L 27/38 398/152 |
| 2013/0003789 | A1* | 1/2013 | Eom ..................... H04B 7/0469 375/219 |
| 2013/0279631 | A1 | 10/2013 | Bowers et al. |
| 2015/0341200 | A1* | 11/2015 | bin Mohd Yussof ........................ H04L 27/2628 370/204 |
| 2017/0019193 | A1 | 1/2017 | Pratt et al. |
| 2017/0131335 | A1 | 5/2017 | Pratt et al. |
| 2017/0353210 | A1 | 12/2017 | Pratt et al. |

OTHER PUBLICATIONS

Anreddy et al., "Capacity of Measured Ricean and Rayleigh Indoor MIMO Channels at 2.4 GHz with Polarization and Spatial Diversity", IEEE Wireless Communications and Networking Conference, vol. 2, Apr. 2006, pp. 946-951.

Barry et al., "Performance of Coherent Optical Receivers", Proceedings of the IEEE, vol. 78, No. 8, Aug. 1990, pp. 1369-1394.

Benedetto et al., "Direct Detection of Optical Digital Transmission Based on Polarization Shift Keying Modulation", IEEE Journal on Selected Areas in Communications, Apr. 1995, vol. 13, No. 3, pp. 531-542.

Benedetto et al., "Polarization Recovery in Optical Polarization Shift-Keying Systems", IEEE Transactions on Communications, Oct. 1997, vol. 45, No. 10, pp. 1269-1279.

Benedetto et al., "Theory of Polarization Shift Keying Modulation," IEEE Transactions on Communications, vol. 40, No. 4, Apr. 1992, pp. 708-721.

Benedetto et al., "Theory of Polarization Spreading Techniques, Part I", IEEE Transactions on Communications, May 1994, vol. 42, No. 5, pp. 2105-2118.

Benedetto et al., "Theory of Polarization Spreading Techniques, Part II", IEEE Transactions on Communications, Jun. 1994, vol. 42, No. 6, pp. 2291-2304.

Biglieri et al., "Limiting Performance of Block-Fading Channels with Multiple Antennas," IEEE Transactions on Information Theory, vol. 47, No. 4, May 2001, pp. 1273-1289.

Cao et al., "Polarization Division Multiple Access with Polarization Modulation for LOS Wireless Communications," EURASIP Journal on Wireless Communications and Networking, vol. 77, Aug. 2011, pp. 9.

Chen et al., "Blind Estimation of OFDM Carrier Frequency Offset via Oversampling," IEEE Transactions on Signal Processing, vol. 52, No. 7, Jul. 2004, pp. 2047-2057.

Chen et al., "Energy Efficiency of Co-Polarized and Space-Polarization MIMO Architectures in Packet-Based Communication Systems", Department of Electrical Engineering, University of Notre Dame, Nov. 2015, pp. 14.

Chen et al., "Three-Dimensional Geometry-Based Stochastic Modeling and Performance of 4x4 Space-Polarization Mobile-to-Mobile Wideband MIMO Channels", 2013 IEEE Global Communications Conference (GLOBECOM), Dec. 9-13, 2013, pp. 3936-3941.

Chen et al., "Energy Efficiency of Space and Polarization MIMO Communications with Packet Erasures over Wireless Fading Channels," IEEE Transactions on Wireless Communications, 2014, pp. 17.

Chen et al., "Space-Polarization MIMO Testbed", in 2013 6th International Symposium on Resilient Control Systems (ISRCS), IEEE, 2013, pp. 128-133.

Choi et al., "ML Estimation of Carrier Frequency Offset for Multicarrier Signals in Rayleigh Fading Channels," IEEE Transactions on Vehicular Technology, Mar. 2001, vol. 50, pp. 664-655.

Coldrey, Mikael, "Modeling and Capacity of Polarized MIMO Channels", Vehicular Technology Conference, 2008, VTC Spring 2008, pp. 440-444.

Cover et al., "Elements of Information Theory," Second Edition, Wiley, 2006, pp. 774.

Dao et al., "3D Polarized Channel Modeling and Performance Comparison of MIMO Antenna Configurations With Different Polarizations", IEEE Transactions on Antennas and Propagation, Jul. 2011, vol. 59, No. 7, pp. 2672-2682.

Eiceg et al., "Dual-Polarization Versus Single-Polarization MIMO Channel Measurement Results and Modeling", IEEE Transactions on Wireless Communications, Jan. 2006, vol. 5 , No. 1, pp. 28-33.

Gallager, Robert G., "Low-Density Parity-Check Codes," Cambridge, MA: MIT Press, 1963, pp. 90.

Ghogho et al., "Optimized Null-Subcarrier Selection for CFO Estimation in OFDM Over Frequency-Selective Fading Channels", IEEE Global Telecommunications Conference (Globecom '01), Nov. 25-29, 2001, vol. 201, pp. 202-206.

Grosinger, Jasmin, "Investigation of Polarization Modulation in Optical Free Space Communications through the Atmosphere", Unpulished Master's Thesis, Institut für Nachrichtentechnik und Hochfrequenztechnik, eingereicht an der Technischen Universität Wien Fakultat fur Elektrotechnik und Informationstechnik, Feb. 2008, pp. 83.

Guo et al., "Spectrum Sensing for Cognitive Radios Based on Directional Statistics of Polarization Vectors", IEEE Journal on Selected Areas in Communications, Mar. 2013, vol. 31, No. 3, pp. 379-393.

Hopcroft et al., "Computer Science Theory for the Information Age," 2012, pp. 400.

Ispas et al., "Dual-Polarized Ricean MIMO Channels: Modeling and Performance Assessment", IEEE Transactions on Communications, Oct. 2013, vol. 61, No. 10, pp. 30.

Kyritsi et al., "Effect of Antenna Polarization on the Capacity of a Multiple Element System in an Indoor Environment", IEEE Journal on Selected Areas in Communications, Aug. 2002, vol. 20, No. 6, pp. 1227-1239.

Liu et al., "A High-Efficiency Carrier Estimator for OFDM Communications," IEEE Communications Letters, vol. 2, No. 4, Apr. 1998, pp. 104-106.

Luise et al., "Carrier Frequency Acquisition and Tracking for OFDM Systems," IEEE Transactions on Communications, Nov. 1996, vol. 44, No. 11, pp. 1590-1598.

Moose, Paul H., "A Technique for Orthogonal Frequency Division Multiplexing Frequency Offset Correction," IEEE Transactions on Communications, Oct. 1994, vol. 42, No. 10, pp. 2908-2914.

(56) References Cited

OTHER PUBLICATIONS

Morelli et al., "An Improved Frequency Offset Estimator for OFDM Applications," IEEE Communications Letters, Mar. 1999, vol. 3, No. 3, pp. 75-77.

Niblack et al., "Polarization Modulation and Demodulation of Light", Applied Optics, Feb. 1964, vol. 3, No. 2, pp. 277-280.

Oestges et al., "MIMO Wireless Communications: From Real—World Propagation to Space-Time Code Design," Elsevier Science, 2010, pp. 457.

Oestges et al., "Dual-Polarized Wireless Communications: From Propagation Models to System Performance Evaluation", IEEE Transactions on Wireless Communications, Oct. 2008, vol. 7, No. 10, pp. 4019-4031.

Oppenheim et al., "Digital Signal Processing", Prentice Hall, New Jersey, PR No. 117, 1975, pp. 75-78.

Peled et al., "Frequency Domain Data Transmission Using Reduced Computational Complexity Algorithms," in Proceeding of the IEEE International Conference on Acoustics, Speech, and Signal Processing, ICASSP, Denver, USA, 1980, pp. 964-967.

Pratt et al., "Adaptive Polarization Transmission of OFDM Signals in a Channel with Polarization Mode Dispersion and Polarization Dependent Loss," IEEE Transactions on Wireless Communications, Jul. 2009, vol. 8, No. 7, pp. 3354-3359.

Pratt et al., "Carrier Frequency Offset (CFO) Estimation for OFDM in Coherent MIMO Systems," University of Notre Dame, Electrical Engineering, Jan. 19, 2016, pp. 17.

Pratt et al., "Polarization-Based Zero Forcing with Channel Estimation", MILCOM 2011, Baltimore, MD, Nov. 2011, pp. 7.

Pratt et al., "Polarization-Modulated Communications," Presentation, Office of Naval Research Science & Technology, 2015, pp. 37.

Pratt et al., "Polarization-Modulated Communications," Annual Review Meeting, Office of Naval Research Science & Technology, Apr. 2015, pp. 30.

Pratt et al., "Polarization-Modulated Communications," Communications Gathering, Office of Naval Research Science & Technology, May 2015, pp. 21.

Schmidl et al., "Robust Frequency and Timing Synchronization for OFDM," IEEE Transactions on Communications, Dec. 1997, vol. 45, No. 12, pp. 1613-1621.

Sirianunpiboon et al., "Diversity Gains Across Line of Sight and Rich Scattering Environments from Space-Polarization-Time Codes," 2007 IEEE Information Theory Workshop on Information Theory for Wireless Networks, 2007, pp. 5.

Talebi et al., "Codeset Overlay for Complementary Code Keying Direct Sequence Spread Spectrum", UBICOMM 2012: The Sixth International Conference on Mobile Ubiquitous Computing, Systems, Services and Technologies, Barcelona, Spain, Sep. 2012, pp. 179-183.

Talebi et al., "Channel Sounding and Parameter Estimation for a Wideband Correlation-Based MIMO Model", IEEE Transactions on Vehicular Technology, Feb. 2016, vol. 65, No. 2, pp. 499-508.

Talebi et al., "Reference No. 15: Channel Sounding and Parameter Estimation for a Wideband Correlation-Based MIMO Model", IEEE Transactions on Wireless Communications, Feb. 2015, pp. 25-34.

Talebi et al., "Time-Domain Correlation-Based Multipath Modeling of Wideband Space-Polarization Mimo Channels", 2013 IEEE Military Communications Conference, Nov. 2013, pp. 1227-1232.

Tang, Xuan, "Polarisation Shift Keying Modulated Free-Space Optical Communication Systems", Doctoral Thesis, Northumbria University, Feb. 2012, pp. 239.

Tureli et al., "Multicarrier Synchronization with Diversity," IEEE, 2001, pp. 952-956.

Tureli et al., "OFDM Blind Carrier Offset Estimation: ESPRIT," IEEE Transactions on Communications, Sep. 2000, vol. 48, No. 9, pp. 1459-1461.

Valenzuela-Valdés et al., "The Role of Polarization Diversity for MIMO Systems Under Rayleigh-Fading Environments," IEEE Antennas and Wireless Propagation Letters, Dec. 2006, vol. 5, No. 1, pp. 534-536.

Wei et al., "An Optimal Pre-Compensation Based Joint Polarization-amplitude-phase Modulation Scheme for the Power Amplifier Energy Efficiency Improvement," IEEE ICC 2013—Selected Areas in Communications Symposium, Jun. 2013, pp. 4137-4142.

Weinstein et al., "Data Transmission of Frequency Division Multiplexing Using the Discrete Frequency Transform," IEEE Transactions on Communications Technology, Oct. 1971, vol. COM-19, No. 5, pp. 628-634.

Wu et al., "LDPC Code Performance and Achievable Rate of Polarization Signaling," Department of Electrical Engineering, University of Notre Dame, pp. 6.

Wu et al', "Polarization Signaling for Wireless Communication," Department of Electrical Engineering, University of Notre Dame, May 2016, pp. 6.

Xiong et al., "The Effect of Doppler Frequency Shift, Frequency Offset of the Local Oscillators, and Phase Noise on the Performance of Coherent OFDM Receivers," NASA/TM 2001-210595, Mar. 2001, pp. 16.

Yofune et al., "Optimization of Signal Design for Poly-Polarization Multiplexing in Satellite Communications," Journal of IEEE Communications Letters, vol. 17, No. 11, Nov. 2013, pp. 4.

Zhou et al., "Blind CFO Estimation for Zero-Padded OFDM over Underwater Acoustic Channels," Oceans 2011, Sep. 19-22, 2011, pp. 7.

\* cited by examiner

Tx Sidelobe, Rx Mainbeam

Tx and Rx Mainbeams

SPACE-POLARIZATION MODULATED COMMUNICATIONS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This application claims priority to U.S. Provisional Patent Application No. 62/150,127, filed Apr. 20, 2015, and entitled "METHOD AND APPARATUS FOR POLARIZATION-MODULATED COMMUNICATION," and to U.S. Provisional Patent Application No. 62/158,954, filed May 8, 2015, and entitled "SYSTEM AND METHOD OF COMMUNICATION USING POLARIZATION," and to U.S. Provisional Patent Application No. 62/325,436, filed Apr. 20, 2016, and entitled "SPACE-POLARIZATION MODULATED COMMUNICATIONS," the entireties of all of which are hereby incorporated by reference herein.

STATEMENT REGARDING FEDERALLY SPONSORED R&D

This invention was made with government support under contract N00014-15-1-2057 awarded by the U.S. Office of Naval Research. The government has certain rights in the invention.

BACKGROUND

Field

The field of this disclosure relates to space-polarization modulated communications.

Description of the Related Art

Wireless telecommunications have permeated almost every sector of life. As wireless communication expands, the demands placed upon the reliability and efficiency of wireless technology increase. Accordingly, it would be advantageous to provide new techniques for efficiently and effectively performing wireless communication.

SUMMARY

In some embodiments, a method of performing adaptive communications in a transmitter comprises: modulating a coherence state specified by a pair of signals based on data to be transmitted to a receiver, the modulation being performed according to a modulation scheme; transmitting the pair of signals to the receiver using two antennas from among spatially-separated dual-polarized antennas; obtaining channel state information for the channel between the transmitter and the receiver; and altering the modulation scheme based on the channel state information.

In some embodiments, a method for determining a decision boundary for a constellation point of a digital communication scheme in a receiver comprises: detecting a plurality of coherence states specified by signals received from a transmitter by the receiver; determining one or more statistical properties of the detected coherence states; specifying the decision boundary for the constellation point based on the one or more statistical properties.

In some embodiments, a method for performing frequency offset estimation in a receiver comprises: detecting a plurality of signals transmitted from a transmitter; determining amplitude and phase information for a plurality of frequency components of each of the plurality of signals; determining a set of comparison values by comparing the respective amplitude and phase information from one or more pairs of the plurality of signals; and determining an estimate of frequency offset for one or more of the plurality of signals based on the amount of noise present in the set of comparison values.

In some embodiments, a method for transmitting data to a receiver using an analog modulation scheme comprises: modulating polarization or coherence states of a plurality of frequency sub-bands for a pair of signals based on image data; and transmitting the pair of signals to a receiver.

In some embodiments, a method for reducing peak-to-average power ratio for transmitted signals in a transmitter comprises: testing a plurality of phase codes to determine their effect on peak-to-average power ratio for each of a pair of signals that are modulated with data according to a multi-carrier modulation scheme; identifying a single phase code that reduces peak-to-average power ratio for each of the pair of signals; applying the identified phase code to each of the pair of signals; and transmitting the pair of signals coherently to a receiver.

DETAILED DESCRIPTION

Figure 1:
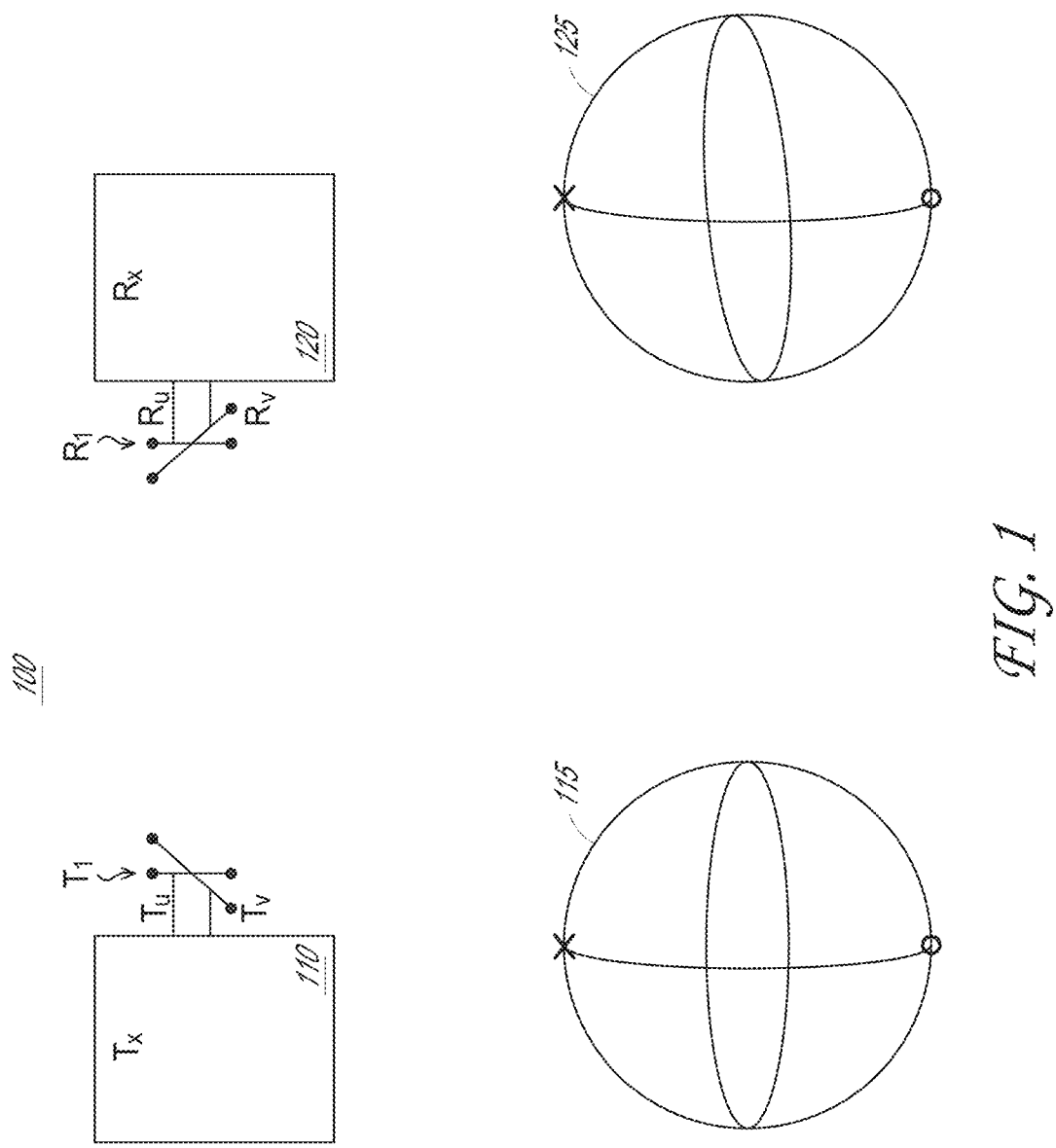
FIG. 1 illustrates a system for performing polarization-modulated communications.

The following disclosure includes several sections, some of which correspond to articles which have been provided in the provisional patent applications to which this application claims priority. The bibliographies referenced in these sections can be found in the provisional applications. Each of the referenced documents is hereby incorporated by reference herein in its entirety. Further, the numbering of subsections, equations, and tables may begin anew in each section.

This disclosure describes systems and methods for performing space-polarization modulated communications. The disclosure will begin with a description of polarization-modulated communications. Then, the discussion will be generalized to a description of space-polarization modulated communications.

Polarization is a fundamental property of an electromagnetic wave describing its orientation as it propagates out from its source. This orientation is defined in terms of the time-varying electric field that makes up one of the two waves comprising the electromagnetic wave—the other being a time-varying magnetic field perpendicular to the electric field. Both the electric and magnetic waves lie perpendicular to the direction of propagation. More precisely, at a fixed point in space sufficiently far from the transmit antenna that one can assume planar wave behavior, the polarization state of an electromagnetic wave describes the motion of the tip of the instantaneous electric field vector with time. Examples of polarization states include: Linear polarization, in which the variation in the electric field vector at a particular point in space traces a straight line; Horizontal (or "H") polarization, a form of linear polarization in which the line lies in a plane horizontal to the face of the earth; Vertical (or "V") polarization, a form of linear polarization in which the line lies in a plane perpendicular to the face of the earth; Left-hand circular polarization (LHCP), in which the variation in the electric field vector at a particular point in space traces a circle in a clockwise direction as viewed looking at the approaching wave; and Right-hand circular polarization (RHCP), in which the variation in the electric field vector at a particular point in space traces a circle in a counter-clockwise direction as viewed looking at the approaching wave. Most generally, an electromagnetic wave's polarization state is characterized as an ellipse, with linear and circular polarization being special cases.

Two polarization states are orthogonal to one another if neither of the states contains components of the other; for example, "H" and "V" polarized waves are orthogonal. An idealized horizontally-oriented antenna generates an H-polarized wave that (assuming its polarization is not changed as it propagates) will invoke no response in an idealized vertically-oriented antenna. Perhaps less obviously, LHCP and RHCP waves are also orthogonal. Any polarization state can be generated as a linear combination of two orthogonally polarized waves. Compared to other fundamental wave properties—frequency, amplitude, and phase—polarization has been under-utilized in the context of communications.

FIG. 1 illustrates a system 100 for performing polarization-modulated communications. The system 100 includes a transmitter 110 and a receiver 120. The transmitter 110 sends wireless signals to the receiver 120 via electromagnetic radiation. The transmitter 110 includes a dual-polarized antenna T1. Similarly, the receiver 120 also includes a dual-polarized antenna R1. Both of these dual-polarized antennas can be u-polarized and v-polarized, where u and v can represent any pair of orthogonal polarizations, including vertical and horizontal, right and left-hand circular, slant +45° and slant −45°, etc.

The transmitter 110 can send signals having any arbitrary polarization state. The polarization state is determined by the relative amplitudes and phases of the signal components that are transmitted via the u-polarized and v-polarized portions of its antenna T1. Similarly, the receiver 120 can determine the polarization state of any signal it receives by analyzing the relative amplitudes and phases between the signal components that are received via the u-polarized and v-polarized portions of its antenna R1.

In polarization-modulated communications, the transmitter 110 can communicate data to the receiver 120 by controlling the polarization states of the signals it sends. For example, in a simple binary modulation scheme, a vertically-polarized signal may correspond to a digital "1" while a horizontally-polarized signal may correspond to a digital "0." The receiver 120 can detect the polarization state of each received signal and thereby decode the transmitted data.

A Poincaré sphere can be used to visualize polarization states. FIG. 1 illustrates a first Poincaré sphere 115 which shows the polarization states of signals sent by the transmitter 110 according to a binary polarization modulation scheme. Each point on the surface of the Poincaré sphere corresponds to a different polarization state. Points on the Poincaré sphere which are diametrically opposed to one another represent orthogonal polarization states.

The first Poincaré sphere 115 includes an "X" and an "O" on opposite sides of the equator. In this example, these polarization states can be respectively understood as vertical and horizontal polarization states. FIG. 1 also illustrates a second Poincaré sphere 125 which shows the polarization states of signals detected by the receiver 120, where for illustrative purposes we have assumed propagation through a unit-gain frequency-flat channel without noise. In the illustrated example, the receiver 120 detects one signal with vertical polarization, as indicated by the "X" at the vertical polarization location on the Poincaré sphere 125. Meanwhile, the receiver 120 also detects a signal with horizontal polarization, as indicated by the "O" located at the horizontal polarization location on the Poincaré sphere 125. In actual propagation channels, however, the received polarization states may not match the transmitted polarization states, for example due to noise (typically assumed to be additive complex white Gaussian noise), antenna response differences, and also due to multipath effects in the propagation channel. In the illustrated example, the receiver 120 can easily decode the data by marking any signal whose polarization state lies within the top half of the Poincaré sphere 125 as corresponding to a vertically-polarized transmitted signal which is understood as a digital "1." Similarly, the receiver 120 can mark any signal whose polarization state lies within the bottom half of the Poincaré sphere 125 as corresponding to a horizontally-polarized transmitted signal which is understood as a digital "0." The decision boundary in this instance can be the equator of the sphere.

As just mentioned with respect to FIG. 1, noise, antenna properties, and multipath effects can alter the polarization states of signals in the link between a transmitter and a receiver. For this discussion we shall neglect the effects of the noise, which randomizes the detected polarization about the true polarization state, and the antenna effects, which scale outgoing signals and incoming signals at the receiver in a manner that depends on various factors, including direction of arrival, frequency, and temperature. We shall focus the discussion principally on the effects of a multipath channel, which induces dispersion, or a frequency-dependent polarization response, in the polarization of the received signal. Multipath propagation effects are discussed with respect to FIG. 2.

Figure 2:
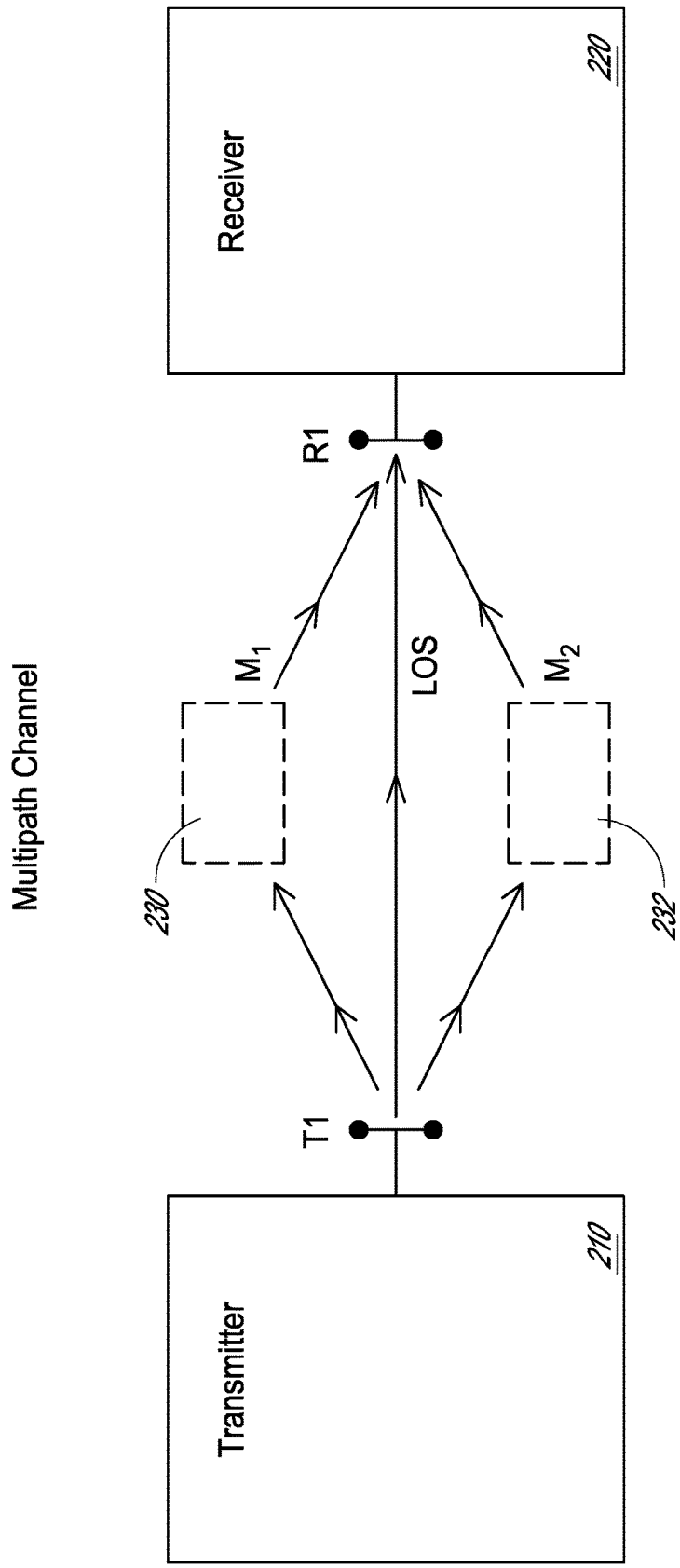
FIG. 2 illustrates a radio frequency (RF) transmitter and receiver operating in a multipath channel.

FIG. 2 illustrates a radio frequency (RF) transmitter 210 and receiver 220 operating in a multipath channel. The transmitter 210 includes an antenna T1 which transmits RF waves into the multipath channel. The RF waves are received by the receiver antenna R1. The multipath channel includes one or more targets 230, 232 which reflect, refract, diffract, scatter, or otherwise cause the transmitted radio waves to arrive at the receiver antenna R1 along multiple paths.

In the illustrated example, RF waves from the transmitter antenna T1 arrive at the receiver antenna R1 along a line of sight (LOS) pathway and along two other multipaths $M_1$ and $M_2$ which result from the presence of the targets 230, 232. In some cases, the multipath effects introduced by the targets 230, 232 can be time-varying. For example, a target in the multipath channel can be physically moving or it can have some other time-varying characteristic which affects the RF waves received at the receiver. The collective response consisting of effects from the transmitter, the channel, and the receiver can be referred to as the system response, the system impulse response, the system transfer function, the time varying system impulse response, the time-varying system transfer function, etc.

Multipath propagation effects can modify a transmitted signal in many ways, including by introducing (through scattering, reflection, refraction, diffraction, etc.) constructive or destructive interference through multipath components that are shifted in phase, time delayed, frequency shifted, changed in amplitude, and/or changed in polarization. Similar effects can also occur in other types of frequency-selective channels. For example, the channel could be one in which one (or perhaps more) path(s) are themselves frequency-selective, such as a frequency-selective medium or a frequency selective surface reflection.

The phenomenon referred to herein as polarization mode dispersion can generally be understood as a variation in the polarization state of the received signal as a function of the signal's frequency components (i.e., the polarization state(s) is/are altered distinctly for the different frequency components of the received signal(s)). Polarization mode dispersion can occur, for example, in channels exhibiting a delay spread between orthogonally-polarized signal components. One example of polarization mode dispersion is that the channel may couple vertically polarized waves into horizontally polarized waves on paths with different delays relative to the vertically polarized path, possibly in a frequency-dependent fashion, or vice versa. For each polarization mode, the complex transfer function gains (amplitude and phase) in the channel may exhibit distinct variations as a function of frequency, leading to polarization mode dispersion.

In some embodiments, the receiver 220 calculates polarization values for each sub-band of the signals received from the transmitter 210. This can be done by, for example, using a dual-polarization antenna to detect orthogonal polarization signal components, and then using frequency-domain representations of the baseband signals to calculate a Jones vector or Stokes parameters. These calculations are known in the art and examples are provided in U.S. Patent Publication 2013/0332115, which is incorporated herein by reference. In some cases normalized Stokes parameters can be used, leading to a 3-component Stokes vector. In other cases, amplitude information can be included, leading to a 4-component Stokes vector. In the latter case, Stokes parameters ($S_0$, $S_1$, $S_2$, and $S_3$) for each sub-band can be calculated according to the following equations: $S_0=(Y_1 \cdot Y_1^*)+(Y_2 \cdot Y_2^*)$; $S_1=(Y_1 \cdot Y_1^*)-(Y_2 \cdot Y_2^*)$; $S_2=(Y_1 \cdot Y_2^*)+(Y_2 \cdot Y_1^*)$; and $S_3=j(Y_1 \cdot Y_2^*)-j(Y_2 \cdot Y_1^*)$, where $Y_1$ is a complex number with amplitude and/or phase information for a first signal in the pair of signals being compared and $Y_2$ is a complex number with amplitude and/or phase information for a second signal in the pair of signals being compared.) When calculated using signals from a dual polarization (orthogonally-polarized) antenna, the result of these computations is polarization state information. The polarization information may be computed for each sub-band of the down-converted baseband signals received at the antenna R1. The polarization can be measured in a relative sense, or, if the orientation of the receiver antenna R1 is known, in an absolute sense.

The polarization state information for the frequency sub-bands characterizes the polarization mode dispersion—the frequency-dependency of the polarization mode shifting-caused by the channel or other factors. The polarization values (e.g., the Stokes parameters) for each sub-band can be plotted on or about a Poincaré sphere as a visualization aid. For example, the normalized $S_1$, $S_2$, and $S_3$ Stokes parameters for each sub-band can be taken as coordinates and plotted as a point on the Poincaré sphere (which has a unit radius). Each location on the Poincaré sphere corresponds to a different polarization state. When the Stokes parameters for multiple sub-bands are plotted, the result is a locus of points which can be referred to as a polarization mode dispersion (PMD) curve.

Figure 3:
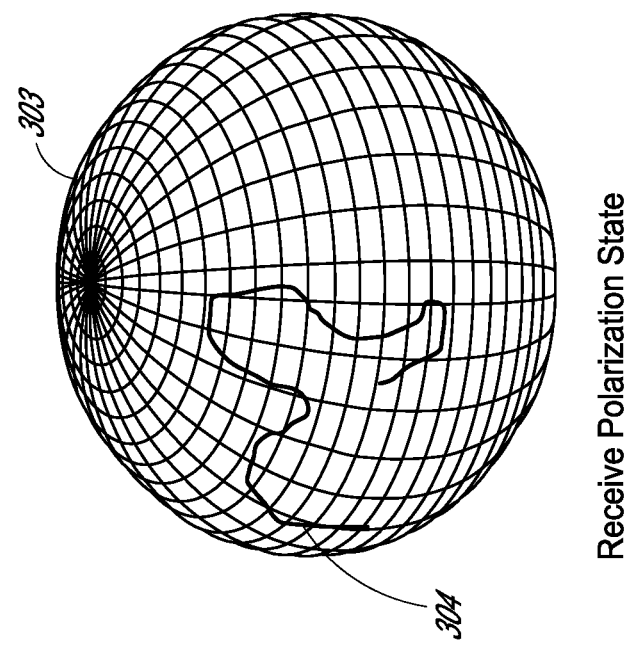
FIG. 3 shows Poincaré spheres which illustrate polarization mode dispersion which can be caused by multipath propagation effects.
Figure 3:
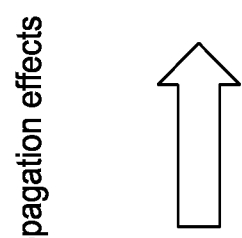
Figure 3:
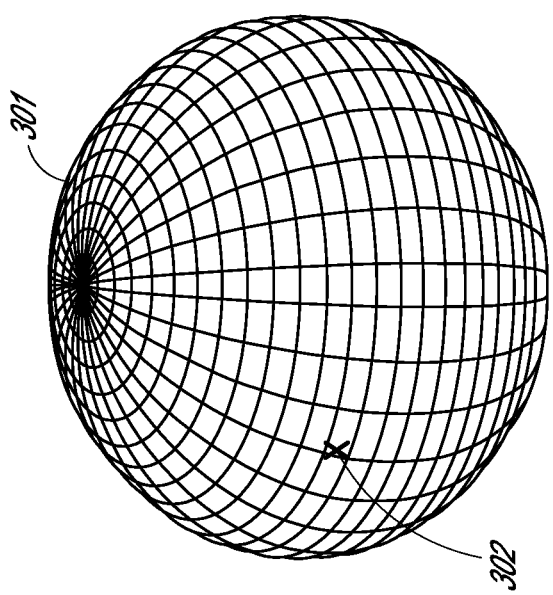

FIG. 3 shows Poincaré spheres which illustrate polarization mode dispersion which can be caused by multipath propagation effects. The Poincaré sphere 301 on the left illustrates the transmitted polarization state 302 of a signal having some amount of bandwidth. As indicated by the single "X" on the sphere, the polarization state 302 of the transmitted signal is constant and does not vary as a function of frequency across the bandwidth of the signal. However, as just discussed, the propagation channel between the transmitter and the receiver can induce polarization mode dispersion. This is evident from the Poincaré sphere 303 on the right, which illustrates the polarization state of the received signal as a function of frequency. As already noted, each point on the Poincaré sphere corresponds to a different polarization state. And the illustrated polarization mode dispersion (PMD) curve 304 is made up of the locus of plotted polarization states for each frequency sub-band of the received signal.

Due to frequency-selective effects in the propagation channel, the frequency sub-bands of a signal of a given bandwidth can exhibit different polarization states at the receiver even when all the frequency sub-bands originate from the transmission source(s) with the exact same polarization. The specific polarization mode dispersion which occurs is in general unique to the specific propagation channel from a given transmission source to the receiver.

Figure 4:
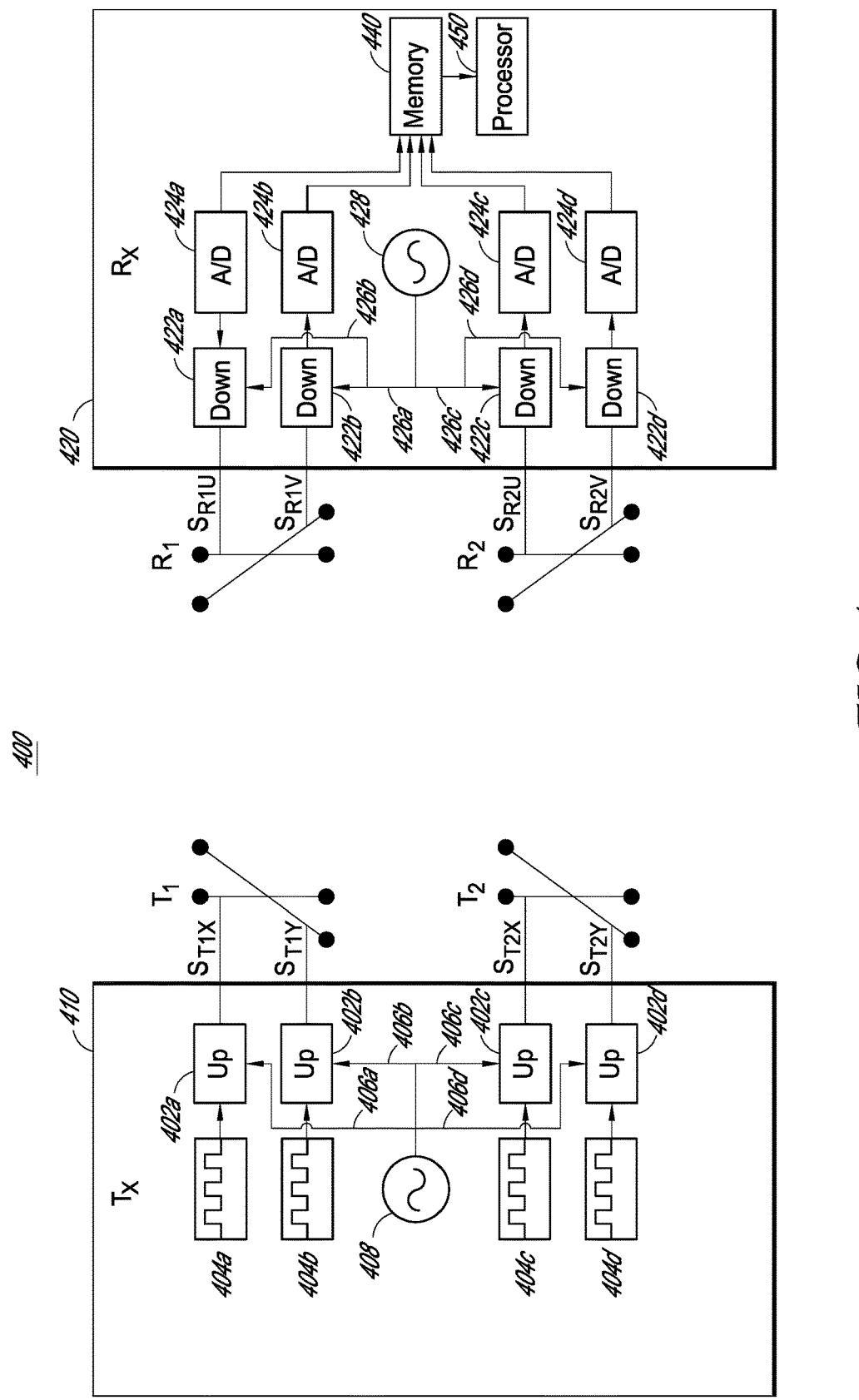
FIG. 4 illustrates a system for performing space-polarization modulated communications.

FIG. 4 illustrates a system 400 for performing space-polarization modulated communications. The system 400 includes a transmitter 410 and a receiver 420. The transmitter 410 sends wireless signals to the receiver 420 via electromagnetic radiation. The transmitter 410 includes two spatially-separated dual-polarized antennas T1 and T2. Similarly, the receiver 420 also includes two spatially-separated dual-polarized antennas R1 and R2. In some embodiments, the transmitting antennas T1, T2 are typically separated by at least 0.5 wavelengths of the RF carrier frequency used by the transmitter 410. The same is true of the receiving antennas R1, R2. The dual-polarized antennas T1 and T2 of the transmitter 410 can be x-polarized and y-polarized, where x and y can represent any pair of orthogonal polarizations. The dual-polarized antennas R1 and R2 of the receiver 420 can be u-polarized and v-polarized, where u and v can also represent any pair of orthogonal polarizations. In some embodiments, either the u- or v-polarization is co-polarized with the x- or y-polarization of the transmitting antennas, but this is not required. Further, although the two transmitting antennas T1, T2 are illustrated as being co-polarized, this is not required. Nor is it required that the two receiving antennas R1, R2 be co-polarized.

The transmitter 410 includes four waveform generators 404a-404d that can respectively provide baseband waveforms $S_{T1x}$, $S_{T1y}$, $S_{T2x}$, and $S_{T2y}$ that are coherently synthesized and centered at or near a carrier frequency $f_0$ and transmitted via the transmitting antennas T1 and T2. The waveform generators 404a-404d can provide any of the following waveforms: single tone continuous wave, wideband noise, band-limited noise, chirp, stepped frequency, multi-tone, pulses, pulsed chirps, orthogonal frequency division multiplexing (OFDM), binary phase shift keying (BPSK), linear FM on pulse (LFMOP), etc. It should be understood, however, that these are just example waveforms and that a wide variety of other waveforms can also be used, including any desired arbitrary waveform that may be suited to a given application. Each of the waveform generators 404a-404d will typically transmit different waveforms at any given time, but the transmitted waveforms from the generators will be synthesized coherently. For example, in some embodiments when using a dual-polarized transmit channel, the transmitted signals are derived from scaled and/or phase-shifted versions of otherwise similar frequency-domain signal representations. By controlling the relative amplitude and phase between orthogonally polarized frequency-domain sub-bands, the transmitted polarization state for each sub-band can be controlled to convey data. In other embodiments, it is also possible to generate time-delayed signals, each with a controlled relative scaling and/or shift between the orthogonally-polarized channels, for example to intentionally induce dispersion.

The baseband waveforms produced by the waveform generators 404a-404d are provided to up-converters 402a-402d to be centered at an RF carrier frequency $f_0$. The RF carrier frequency is provided by the local oscillator 408. The carrier frequency is fed from the local oscillator 408 to the up-converters 402a-402d via signal lines 406a-406d. In some embodiments, the signal lines 406a-406d are matched signal lines so as to maintain the phase coherency of the carrier frequency at the up-converters 402a-402d. As shown in FIG. 4, a single local oscillator 408 can feed all four up-converters 402a-402d. Alternatively, different local oscillators can respectively feed the up-converters 402a-402d. If different local oscillators are used, they are preferably synchronized in phase and frequency. In some embodiments, the transmitter 410 operates coherently such that the transmitted signals $S_{T1x}$, $S_{T1y}$, $S_{T2x}$, and $S_{T2y}$ are coherently synthesized. FIG. 4 illustrates one system for coherently synthesizing transmit signals, but others can also be used. For example, the transmitter 410 can transmit multiple coherent continuous-wave or pulsed (or otherwise modulated) RF tones. Or multiple coherent signals can be directly generated using digital signal processing followed by digital-to-analog conversion. Other methods of coherent signal generation are also possible.

As just discussed, in some embodiments, the transmitted signals are coherent, where time synchronicity and phase are preserved between the various transmitter signals. One way to achieve coherency between the transmitted signals is to employ similar path lengths in the circuitry and to share a common local oscillator 408 used in the up-conversion processing. A common local oscillator can be advantageous in a multichannel transmitter because any impairments in the local oscillator may affect all channels relatively equally, thus not substantially affecting relative channel-to-channel comparisons. In some instances, control over the local oscillator phase may be advantageous, for example to assure that the starting phase reference for each transmitted signal is substantially identical (or if not identical then known so that the phase difference between transmitted signals can be compensated). In some embodiments, the transmitter can advantageously achieve precise control of the phase, amplitude, sampling, and frequency among the various generated signals used at the transmitter. Further, in some embodiments, the phase noise of the local oscillator 408 is negligible such that energy of a desired signal in one sub-band coupling to an adjacent sub-band is significantly less (e.g., two or more orders of magnitude less) than the signal being detected in that adjacent band.

In addition, in some embodiments, each signal channel in the transmitter can be substantially phase and gain matched with the others. In order to achieve this matching, compensation circuits can be included. For example, if the transmitter includes different amplifier circuits in each channel, then depending upon the transmit signal and the non-linear behavior of the amplifier in each channel, it may be possible for asymmetrical signal distortion to occur (e.g., the effects on one channel are not identical to the other channels). Such behavior could be detrimental to a coherent, matched system, and so compensation circuits can be used to reduce or minimize phase and gain mismatches in the channels.

Although the transmitter 410 in FIG. 4 is shown in more detail than the transmitters in preceding figures, each of the transmitters discussed herein can include elements and features similar to those discussed with respect to the transmitter 410 to coherently synthesize transmit signals.

In some embodiments, the transmitted signals $S_{T1x}$, $S_{T1y}$, $S_{T2x}$, and $S_{T2y}$ are advantageously separable. This means that the transmitted signals $S_{T1x}$, $S_{T1y}$, $S_{T2x}$, and $S_{T2y}$ have the property that they can be distinguished from one another by the receiver 420. The separability property of the transmitted signals can be achieved in several different ways, including, for example, through the use of time division multiplexing, frequency division multiplexing, and/or code division multiplexing. Methods based on eigendecomposition or singular value decomposition can also be used. Other methods may also be possible.

Prior to transmission, the signals can also be conditioned to reduce peak-to-average power ratio levels, for example using companding or other methods, and also integrate a cyclic prefix or guard interval to help limit intersymbol interference.

The first transmitter antenna T1 transmits orthogonally-polarized signal components $S_{T1x}$ and $S_{T1y}$. The second transmitter antenna T2 transmits orthogonally-polarized signal components $S_{T2x}$ and $S_{T2y}$. The respective channels between the first and second transmitter antennas T1, T2 and the receiver 420 can include frequency-selective propagation effects that cause different modified versions of the transmitted signals to be received at the spatially-separated dual polarized receiving antennas R1, R2. The first receiving antenna R1 detects orthogonally-polarized components of channel-modified versions of the transmitted RF signals. The signal notations $S_{R1u}^{T1x}$, $S_{R1u}^{T1y}$, $S_{R1u}^{T2x}$, and $S_{R1u}^{T2y}$ can be used to respectively represent the u-polarized component of the detected signals at the first receiving antenna R1 due to the transmitted signals $S_{T1x}$, $S_{T1y}$, $S_{T2x}$, and $S_{T2y}$. In general, $S_{R1u}^{T1x}$, $S_{R1u}^{T1y}$, $S_{R1u}^{T2x}$, and $S_{R1u}^{T2y}$ may be overlapping in time and/or frequency and may be collectively referenced as $S_{R1u}$. Meanwhile, the signals $S_{R1v}^{T1x}$, $S_{R1v}^{T1y}$, $S_{R1v}^{T2x}$, and $S_{R1v}^{T2y}$ respectively represent the v-polarized components of the detected signals at the first receiving antenna R1 due to the transmitted signal $S_{T1x}$, $S_{T1y}$, $S_{T2x}$, and $S_{T2y}$. Again, in general, $S_{R1v}^{T1x}$, $S_{R1v}^{T1y}$, $S_{R1v}^{T2x}$, and $S_{R1v}^{T2y}$ may be overlapping in time and/or frequency and may be collectively referenced as $S_{R1v}$. In this notation, for any given received signal the subscript indicates the receiving antenna and polarization channel whereas the superscript indicates the transmitted signal which excited that particular received signal. Using this notation, the u-polarization components detected at R2 due to the transmitted signals $S_{T1x}$, $S_{T1y}$, $S_{T2x}$, and $S_{T2y}$ can be written as $S_{R2u}^{T1x}$, $S_{R2u}^{T1y}$, $S_{R2u}^{T2x}$, and $S_{R2u}^{T2y}$, respectively. These signals can also be overlapping in time and/or frequency and can collectively be referenced as $S_{R2u}$. And the v-polarization components detected at R2 due to the transmitted signals $S_{T1x}$, $S_{T1y}$, $S_{T2x}$, and $S_{T2y}$ can be written as $S_{R2v}^{T1x}$, $S_{R2v}^{T1y}$, $S_{R2v}^{T2x}$ and $S_{R2v}^{T2y}$, respectively. These signals, too, can be overlapping in time and/or frequency and can collectively be referenced as $S_{R2v}$.

The receiver 420 can down-convert the received signals $S_{R1u}$, $S_{R1v}$, $S_{R2u}$, and $S_{R2v}$ and perform analog-to-digital conversion. This is done using the down-converters 422a-422d and the analog-to-digital converters 424a-424d. Each of these components can be connected to, and controlled by, a common local oscillator 428 and/or clock signal (as applicable depending upon the circuitry) in order to maintain consistent phase and/or timing references. For example, the signals can be down-converted using a consistent phase reference and the analog-to-digital converters can take synchronous samples. This helps to ensure that relative phase information between the input signals is preserved in the digitized signals. In addition, the signal lines 426a-426d from the local oscillator 628 to these signal components can be matched so as to further help maintain phase coherency in the receiver. Although FIG. 4 illustrates a single local oscillator 428, multiple oscillators can be used if they are synchronized. The digital signals that are output from the analog-to-digital converters 424a-424d can be saved in a memory 440 and sent to a processor 450 for analysis. Though not illustrated, the receiver 420 can also include signal conditioning circuitry, such as amplifiers, filters, etc. In addition, the receiver 420 could include an intermediate frequency (IF) processing stage.

In some embodiments, the received signals are coherently received and analyzed. Phase information can be preserved between the various received signals. For example, the received signals can share a common local oscillator 428 used in the down-conversion processing and the signals can be synchronously sampled during digital conversion. Coherence at the receiver may entail synchronization of the signal channels in various forms, which can include: phase synchronization; frequency synchronization; sampling synchronization; and local oscillator synchronization in frequency, time, and/or phase. Additionally, it may be desirable that the receiver signal channels are gain and phase matched (from the antennas to the analog-to-digital converters) across all frequency components of interest and that the local oscillator signal gains to each channel are substantially matched. In some embodiments, the receiver 420 can advantageously achieve precise control of the phase, amplitude, sampling, and frequency among the various receiver channels.

Although the receiver 420 in FIG. 4 is shown in more detail than the receiver in FIG. 1, each of the receivers discussed herein can include elements and features similar to those discussed with respect to the receiver 420 in order to coherently receive and analyze the received signals.

Once the $S_{R1u}$, $S_{R1v}$, $S_{R2u}$, and $S_{R2v}$ signals are down-converted and sampled, the frequency component phases and amplitudes of the baseband signals can be compared with one another. This can be done in the time domain (e.g., via a filter bank) or in the frequency domain. For example, each of the received signals can be converted into the frequency domain using an N-point FFT operation. This operation divides the bandwidth of each of the down-converted $S_{R1u}$, $S_{R1v}$, $S_{R2u}$, and $S_{R2v}$ signals into N frequency bins. The respective amplitudes and/or phases of the frequency components of the $S_{R1u}$, $S_{R1v}$, $S_{R2u}$, and $S_{R2v}$ signals can then be compared for each sub-band. For example, the amplitudes of the frequency components of one of the signals can be compared to those of another by calculating the ratios of the amplitudes. Similarly, the phases of the frequency components of one of the signals can be compared to those of another by calculating differences between the respective phases. These are just some examples of computations which can be performed to compare the respective amplitudes and/or phases. Many others are also possible. For example, in some embodiments, the respective amplitudes and/or phases of the frequency components of the $S_{R1u}$, $S_{R1v}$, $S_{R2u}$, and $S_{R2v}$ signals can be compared by calculating a Jones vector or Stokes parameters (normalized or unnormalized) for each sub-band using any pair of these signals. Other mathematical computations can also be used to compare the phases and/or amplitudes of the frequency components of any pair of the $S_{R1u}$, $S_{R1v}$, $S_{R2u}$, and $S_{R2v}$ signals.

The following six signal pairs can be formed from the $S_{R1u}$, $S_{R1v}$, $S_{R2u}$, and $S_{R2v}$ signals detected by the receiver 420: $S_{R1u}$ and $S_{R1v}$; $S_{R2u}$ and $S_{R2v}$; $S_{R1u}$ and $S_{R2u}$; $S_{R1u}$ and $S_{R2v}$; $S_{R1v}$ and $S_{R2u}$; or $S_{R1v}$ and $S_{R2v}$. If a selected pair of signals both come from the same dual polarized receiver antenna (as is the case for the first two of the six listed pairs), then the result of a Jones vector or Stokes parameter computation would be polarization information (as already discussed above with respect to FIG. 1). However, because the receiving antennas R1 and R2 are not substantially co-located, nor do they necessarily sample orthogonally-polarized components of the transmitted signal, the result of the Jones vector or Stokes parameter computation does not quantify polarization when the selected pair of signals does not come from the same dual polarized antenna (as is the case for the last four of the six listed pairs). In fact, in these cases the resulting values do not describe any particular known physical quantity. Nevertheless, the comparison of the respective amplitudes and/or phases of the signals received at spatially-separated antennas, for each frequency sub-band, can still provide useful information. While the resulting values are not polarization values, they can still be plotted for each sub-band on or about a unit sphere (similar to a Poincaré sphere) as a visualization aid. (If normalization is applied, the signals will fall on a unit sphere, otherwise, in general they will not be confined to a unit sphere.)

For a transmission with bandwidth BW from any one of the transmit ports, where the signal undergoes frequency-selective propagation, the resulting locus of points describing the signal dispersion will depend upon the receiver signal pairs employed. If the two receiver signals are from a single dual-polarized antenna, the resulting dispersion is termed polarization mode dispersion. If the two receiver signals are not from a single dual-polarized antenna, the resulting dispersion is not polarization mode dispersion (PMD). Instead, the resulting dispersion response can be referred to as coherent signal dispersion (CSD). In general, the PMD and CSD curves that are calculated from different pairs of signals detected by the receiver will all be unique.

As PMD and CSD dispersion curves can be calculated from the various pairs of detected signals on the receiver side, PMD and CSD dispersion curves can also be calculated using pairs of transmitted signals on the transmitter side when at least one of the transmit signals is transmitted using a complex-scaled and delayed version of that signal with the purpose of intentionally introducing dispersion at the transmitter (prior to propagation). For example, in the case of the four-channel transmitter 410 illustrated in FIG. 4, the following six signal pairs can be formed from the transmitted signals $S_{T1x}$, $S_{T1y}$, $S_{T2x}$, and $S_{T2y}$: $S_{T1x}$ and $S_{T1y}$; $S_{T2x}$ and $S_{T2y}$; $S_{T1x}$ and $S_{T2x}$; $S_{T1x}$ and $S_{T2y}$; $S_{T1y}$ and $S_{T2x}$; or $S_{T1y}$ and $S_{T2y}$. As discussed above, Stokes parameters or other comparison values can be calculated for each of the foregoing pairs of transmitter signals on a sub-band by sub-band basis. When the transmitted signals are generated using complex-scaled and delayed versions of that signal, usually with different delays and complex coefficients that are different among the transmitters, the resulting transmit dispersion curves for the first two of these signal pairs represent transmitter-side PMD curves, while the resulting curves for the last four of these signal pairs represent transmitter-side CSD curves. By controlling the delays and complex scaling coefficients, the transmitter can generate any arbitrary PMD or CSD dispersed signals.

In some embodiments, to generate transmit signals with different polarization or CSD states versus frequency sub-band, the transmitter can arbitrarily control the polarization or CSD states as a function of frequency by controlling the relative amplitude and phase between the associated transmit signals. Both polarization and CSD states can be designed jointly so that several CSD/PMD transmission curves are achieved simultaneously across the bandwidth (e.g., PMD design for antenna T1; PMD design for antenna T2; CSD design for T1$v$ and T2$v$).

Adaptive Space-Polarization Transmissions Based on Channel State Information

As just discussed, the transmitter 410 can generate signals having any arbitrary PMD or CSD state as a function of frequency sub-band. The transmitter 410 can therefore send signals having any arbitrary polarization or coherence state. The transmitter 410 can modulate these polarization and/or coherence states to communicate information to the receiver 420. Further, the transmitter 410 can adapt the polarization or coherence states of transmitted signals in order to achieve desired goals, such as increasing signal-to-noise ratio, reducing polarization mode dispersion or coherence dispersion, etc. These adaptations can be performed on the basis of channel state information.

A polarization modulation digital communication scheme was discussed above with respect to FIG. 1. The same type of digital communication scheme can be used by the system illustrated in FIG. 4 to communicate on the basis of modulation of the coherence state of a pair of signals transmitted by the transmitter 410. This can be done by, for example, transmitting two signals from spatially-separated antennas at the transmitter. The signals can be transmitted using co-polarized antenna elements or cross-polarized antenna elements.

In some embodiments, a constellation of two or more coherence states is established. Each coherence state in the constellation can correspond to different digital data. The transmitter can then communicate digital data to the receiver 420 by transmitting signals whose coherence states correspond to the desired constellation points. When the signals are received by the receiver 420, the receiver can perform the calculations described herein (e.g., calculation of Stokes parameters) in order to determine the coherence state of each detected signal.

The decision boundaries for each constellation point at the receiver 420 can be set such that they are equidistant from adjacent constellation points. This approach could be used in a receiver that employs channel equalization to compensate the effects of the channel. In such a case, assuming ideal transmit and receivers, the equalized constellation at the receiver would approximately match that of the transmit signal, although the signals might exhibit different spreads due to noise because the transfer gains for the constellation points will typically be different. Therefore, in some embodiments it is beneficial to adjust the decision boundary to compensate for the different symbol powers.

Alternatively, the decision boundaries can be adaptively set without equalization based on statistical characteristics of the detected coherence states. For example, decision boundaries for each constellation point can be set based on the mean position of detected coherence states and/or the variance, spread, or signal-to-noise ratio of the detected coherence states for signals corresponding to that particular constellation point. For example, if signals corresponding to one of the constellation points in the digital modulation scheme suffer from relatively poor signal-to-noise ratio, then the decision boundary corresponding to that constellation point can be adaptively adjusted such that the size of the detection area increases. On the other hand, if signals corresponding to one of the constellation points enjoy particularly good signal-to-noise ratio, then the decision boundary corresponding to the constellation point can be adaptively adjusted such that the size of the detection area decreases, owing to the relatively tight expected spread of detected coherence states. The locations of detection areas for each constellation point can also be adjusted based on the location of the mean detected coherence state for signals corresponding to that constellation point.

In some embodiments, this coherence modulation communication scheme can be adaptive. Adjustments to the scheme can be made on the basis of channel state information for the channel between the transmitter 410 and the receiver 420. In some embodiments, the transmitter 410 may include a processor that analyzes the channel state information and then changes the coherence states of transmitted signals in order to improve or optimize a particular parameter. For example, the transmitter 410 may adapt the communication scheme so as to improve signal-to-noise ratio or reduce coherent signal dispersion, or to achieve minimum signal power level at a receiver port. In some embodiments, the channel state information is provided to the transmitter 410 by the receiver 420. The receiver 420 can calculate the channel state information by, for example, determining PMD and/or CSD curves from the signals it detects from the transmitter. Alternatively, the receiver 420 can function as a transceiver and can send pilot signals to the transmitter 410 which the transmitter can use in order to calculate channel state information itself.

Regardless of the source of the channel state information, the transmitter 410 can use this information to adapt the modulation scheme in a desired manner. Adaptations to the modulation scheme can include, for example, altering the constellation of coherence states (e.g., changing the number of constellation points or the locations of constellation points), altering the pairs of transmitter signals which are used to communicate the data to the receiver, and/or adaptively adjusting the power levels of the transmitted signals so that each constellation point has associated with it a unique power level, for example to maximize communications performance.

Adaptive Decision Boundaries at the Receiver

I. Introduction

As just discussed, in some embodiments, the receiver 420 can adaptively adjust decision boundaries between constellation points in a digital polarization-modulation or coherence-modulation communication scheme. This can be done on the basis of statistics of the detected polarization and/or coherence states of the signals received by the receiver 410. In some embodiments, decision boundaries between constellation points can be adapted without the need to obtain channel state information and without the need to require that the transmitter send pilot signals in order to determine that channel state information. This can improve bandwidth efficiency. In addition, this technique can allow for improved detection without necessarily requiring the receiver to perform equalization.

This section explores fundamental properties of wireless communication using polarization-based modulation. The same techniques can be applied to coherence-based modulation. Channel models for polarization shift keying (PolSK) are developed assuming additive white Gaussian noise (AWGN) and Rayleigh fading; the resulting analysis of a maximum likelihood receiver yields a bound on the symbol error rate (SER) for PolSK that is approximately 1.0 dB tighter than the previously published bound. In addition, insight into the fundamental performance of polarization-based modulation is gained by computing a bound on achievable rate derived from the channel's mutual information, assuming equiprobable inputs. Finally, it is shown how statistical and instantaneous channel state information (CSI) can be exploited at the receiver to form asymmetric decision regions and improve SER performance.

This section develops a model for polarization-based modulation that enables the formulation of a maximum likelihood receiver and the development of subsequent bounds on the symbol error rate (SER) of PolSK. The mutual information between the input and output of a PolSK channel (assuming equally likely inputs) is used to derive fundamental bounds on channel efficiency as a function of SNR. Finally, it is shown how channel state information—both statistical and instantaneous—can be exploited at the receiver to optimize SER for PolSK. The analysis is carried out for channels exhibiting additive white Gaussian noise, i.i.d. Rayleigh fading, and block Rayleigh fading.

II. System Models

A. The Dual-Polarized AWGN Channel

Consider a system in which the only impairment is additive white Gaussian noise (AWGN) applied independently to the H-polarized and V-polarized channels. The discrete-time model for such a system is given by $$\begin{bmatrix} E_{rv} \\ E_{rh} \end{bmatrix} = \begin{bmatrix} E_{tv} \\ E_{th} \end{bmatrix} + \begin{bmatrix} n_v \\ n_h \end{bmatrix}. \quad (1)$$

Here, $[E_{th}\ E_{tv}]^T$ and $[E_{rh}\ E_{rv}]^T$ are the transmit and receive polarized signals in Jones vector notation. The dual-polarized noise $n_v$ and $n_h$ are assumed to be i.i.d. circularly symmetric complex Gaussian with distribution $CN(0,N_0)$. Each polarization state can alternatively be represented as a point on the Poincare sphere with spherical coordinate $(r,\theta,\phi)$ where r is the radius of the Poincare sphere, $\theta$ is the elevation angle, and $\phi$ is the azimuth angle. As derived in "*Spectrum sensing for cognitive radios based on directional statistics of polarization vectors*" by Guo et al. (*Selected Areas in Communications, IEEE Journal*, 31(3):379-393, March 2013), the conditional probability density function (PDF) of the received polarization state $(r,\theta,\phi)$ given the transmitted state $(r_s,\theta_s,\phi_s)$ for the dual-polarized AWGN channel is where $g=(r,r \sin \theta \cos \phi, r \sin \theta \sin \phi, r \cos \theta)^T$ and $g_s=(r_s,r_s \sin \theta_s \cos \phi_s, r_s \sin \theta_s \sin \phi_s, r_s \cos \theta_s)^T$. For an AWGN channel with no fading, the radius of the received state carries almost no information about the transmitted state, and so the received signal can be projected onto the surface of the unit Poincare sphere, yielding a (normalized) conditional PDF given by $$f(\theta, \phi \mid r_s, \theta_s, \phi_s) = \frac{\sin\theta}{4\pi}(1 + k + k \cdot c)\exp(-k) \times \exp(k \cdot c) \quad (3)$$

where $$k = \frac{r_s}{2N_0}$$

and $c=\sin \theta_s \sin \theta \cos(\phi-\phi_s)+\cos \theta_s \cos \theta$. Here, k represents the equivalent SNR per polarization symbol, with $2N_0$ accounting for the total noise variance for both orthogonally polarized components.

B. The Dual-Polarized Rayleigh Fading Channel

Now consider a system in which Rayleigh fading is imposed on all four channels:

$$\begin{bmatrix} E_{rv} \\ E_{rh} \end{bmatrix} = X_{Ray}\begin{bmatrix} E_{tv} \\ E_{th} \end{bmatrix} + \begin{bmatrix} n_v \\ n_h \end{bmatrix}. \quad (4)$$

Here, $X_{Ray}$ is a 2×2 matrix whose elements can be modeled as [6]:

$$\text{vec}(X_{Ray}^H)=R^{1/2}\text{vec}(H_{Ray}^H), \quad (5)$$

where $H_{Ray}$ is a 2×2 matrix whose elements $h_{Ray}^{vv}$, $h_{Ray}^{vh}$, $h_{Ray}^{hv}$ and $h_{Ray}^{hh}$ are i.i.d. complex Gaussian random variables, and R is the polarization correlation matrix:

$$R = \begin{bmatrix} 1 & \sqrt{\mu\chi}\,\vartheta^* & \sqrt{\chi}\,\sigma^* & \sqrt{\mu}\,\delta_1^* \\ \sqrt{\mu\chi}\,\vartheta & \mu\chi & \sqrt{\mu}\,\chi\delta_2^* & \mu\sqrt{\chi}\,\sigma^* \\ \sqrt{\chi}\,\sigma & \sqrt{\mu}\,\chi\delta_2 & \chi & \sqrt{\mu\chi}\,\vartheta^* \\ \sqrt{\mu}\,\delta_1 & \mu\sqrt{\chi}\,\sigma & \sqrt{\mu\chi}\,\vartheta & \mu \end{bmatrix}.$$

Here, $\mu$ is the co-polar ratio (CPR) between the vv and hh channels, while $\chi$ is the cross-polarization discrimination (XPD) which represents the polarization coupling or depolarization effect between the vv and hv channels (or, equivalently, between the hh and vh channels). In addition, $\sigma$ and $\vartheta$ are the receive and transmit polarization correlations, respectively, while $\delta_1$ is the co-polar correlation between the vv and hh channels and $\delta_2$ is the anti-polar correlation between the hv and vh channels.

Assuming that we transmit a polarized signal with unit power, then $[E_{th}\ E_{tv}]^T = [\cos\gamma_s\ \sin\gamma_s\ \exp(j\Phi)_s]^T$ in Jones vector notation, and the result in "*Spectrum sensing for cognitive radios based on directional statistics of polarization vectors*" by Guo et al. can be extended to derive the receive covariance matrix $R_r$ shown in equation (6). In equation (6), $N_0$ is the noise variance for both v and h components, $c_{vv} = \sin^2\gamma_s$, $c_{vh} = c_{hv}^* = \sin\gamma_s\cos\gamma_s\exp(j\Phi_s)$, and $c_{hh} = \cos^2\gamma_s$. Thus we can derive the conditional PDF of the unnormalized polarization state as $$f(r, \theta, \phi \mid \gamma_s, \Phi_s) = \frac{r\sin\theta\exp\left(-\frac{\overline{g}_0 g_0 - \overline{g}_1 g_1 - \overline{g}_2 g_2 - \overline{g}_3 g_3}{2\det(R_r)}\right)}{4\pi\det(R_r)} \quad (7)$$

where $(g_0, g_1, g_2, g_3) = (r, r\sin\theta\cos\phi, r\sin\theta\sin\phi, r\cos\theta)^T$ and $\overline{g}_0, \overline{g}_1, \overline{g}_2, \overline{g}_3) = (r_{hh} + r_{vv}, r_{hh} - r_{vv}, r_{hv} + r_{vh}, j(r_{hv} - r_{vh}))$. After normalization, the conditional PDF is given by $$f(\theta, \phi \mid \gamma_s, \Phi_s) = \frac{\sin\theta}{4\pi} \frac{4\det(R_r)}{(\overline{g}_0 - \overline{g}_1\xi_1 - \overline{g}_2\xi_2 - \overline{g}_3\xi_3)^2} \quad (8)$$

where $\xi_1, \xi_2, \xi_3) = (\sin\theta\cos\phi, \sin\theta\sin\phi, \cos\theta)$.

III. Symbol Error Rate (Ser) of Polarization Shift Keying

Figure 5:
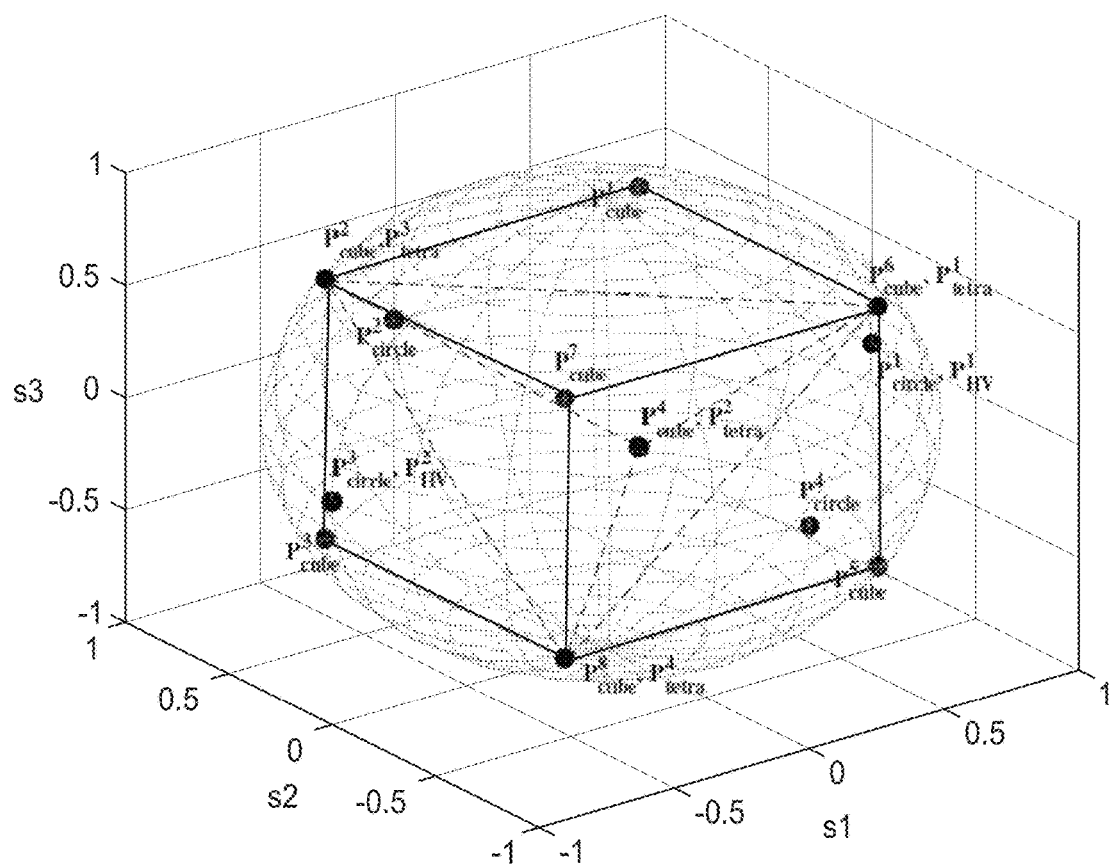
FIG. 5: Constellation for 2PolSK-HV, 4PolSK-circle, 4PolSKtetra, and 8PolSK-cube.

Polarization-based signaling carries information through polarization states rather than absolute amplitude and/or phase. Four different polarization state constellations [4] are shown on the unit Poincare sphere in FIG. 5: 2PolSK-HV, 4PolSKcircle, 4PolSK-tetrahedron, and 8PolSK-cube. Three of these constellations—2PolSK-HV, 4PolSK-tetrahedron, and 8PolSKcube—maximize the spherical distance between constellation points, while 4PolSK-circle lies on the equator.

$$R_r = \left\langle [E_{rh}\ E_{rv}]^T \cdot ([E_{rh}\ E_{rv}]^T)^H \right\rangle = \begin{bmatrix} r_{hh} & r_{hv} \\ r_{vh} & r_{vv} \end{bmatrix} = \quad (6)$$

$$\begin{bmatrix} c_{vv} + c_{vh}\sqrt{\mu\chi}\,\vartheta + & c_{vv}\sqrt{\chi}\,\sigma^* + c_{hv}\sqrt{\mu}\,\delta_1^* + \\ c_{hv}\sqrt{\mu\chi}\,\vartheta^* + c_{hh}\mu + N_0 & c_{vh}\sqrt{\mu}\,\chi\delta_2^* + c_{hh}\mu\sqrt{\chi}\,\sigma^* \\ c_{vv}\sqrt{\chi}\,\sigma + c_{vh}\sqrt{\mu}\,\delta_1 + & c_{vv} + c_{vh}\sqrt{\mu\chi}\,\vartheta + \\ c_{hv}\sqrt{\mu}\,\chi\delta_2 + + c_{hh}\mu\sqrt{\chi}\,\sigma & c_{hv}\sqrt{\mu\chi}\,\vartheta^* + c_{hh}\mu\chi + N_0 \end{bmatrix} \quad (50)$$

A. SER Performance of the Dual-Polarized AWGN Channel

To demodulate the received signal under the maximum likelihood (ML) criterion requires maximizing the conditional PDF. As shown in "*Spectrum sensing for cognitive radios based on directional statistics of polarization vectors*" by Guo et al., at high signal to noise ratio—i.e., for $$k = \frac{r_s}{2N_0} \gg 1$$

—the conditional PDF in (3) can be approximated using the Fisher distribution by $$f(\theta, \phi \mid r_s, \theta_s, \phi_s) = \frac{k\sin\theta}{4\pi\sinh k}\exp[k(x^T \cdot u_s)] \quad (9)$$

where $u_s = (\sin\theta_s\cos\phi_s, \sin\theta_s\sin\phi_s, \cos\theta_s)$ and $x = \sin\theta\cos\phi, \sin\theta\sin\phi, \cos\theta$. $u_s$ and $x$ are the Cartesian coordinates of the transmitted and received polarization states on the unit Poincare sphere. Thus, the ML decision rule becomes:

$$x^T \cdot u_1 \underset{u_2}{\overset{u_1}{\gtreqless}} x^T \cdot u_2 \quad (10)$$

Figure 6:
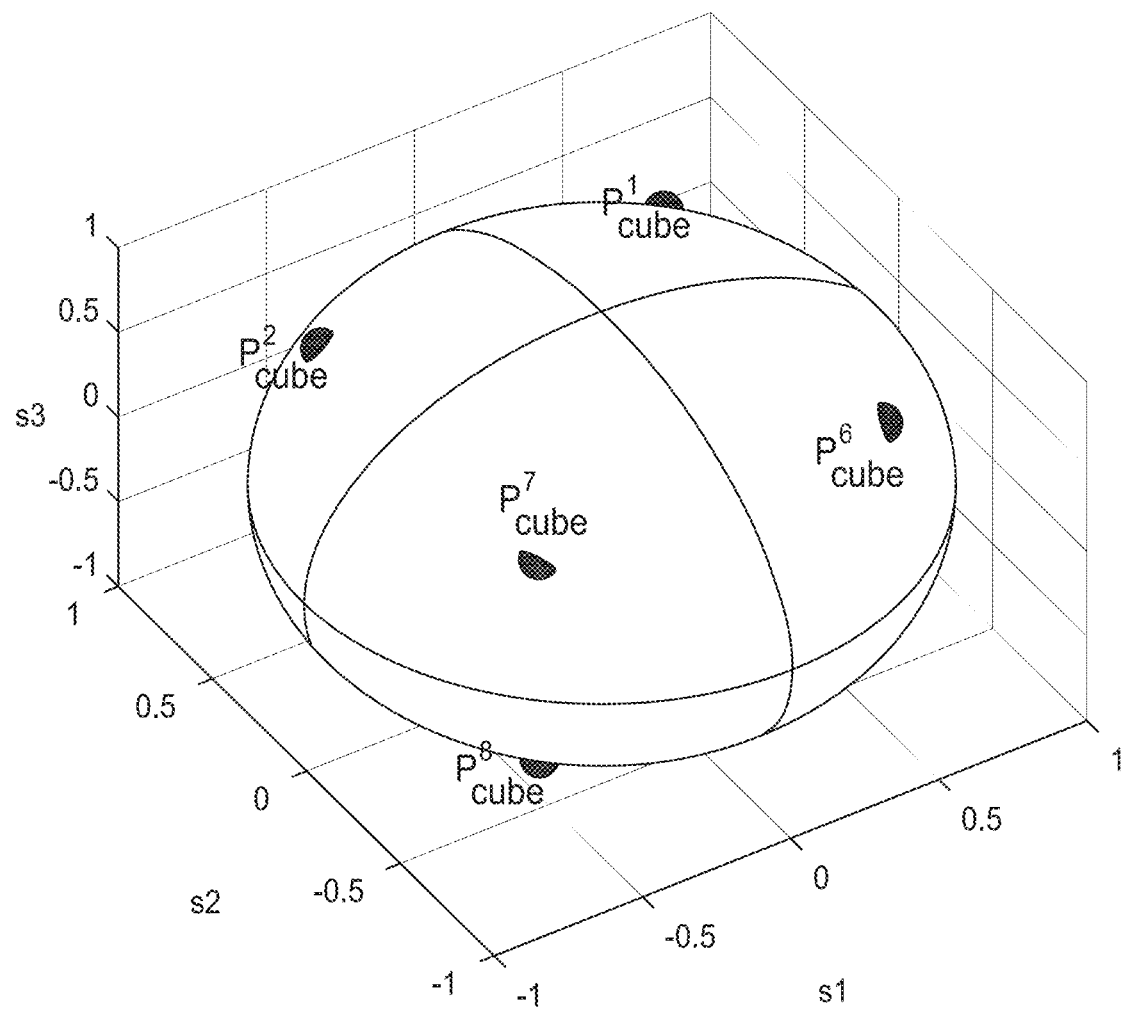
FIG. 6: Decision region for 8PolSK under MIP criterion.
Figure 7:
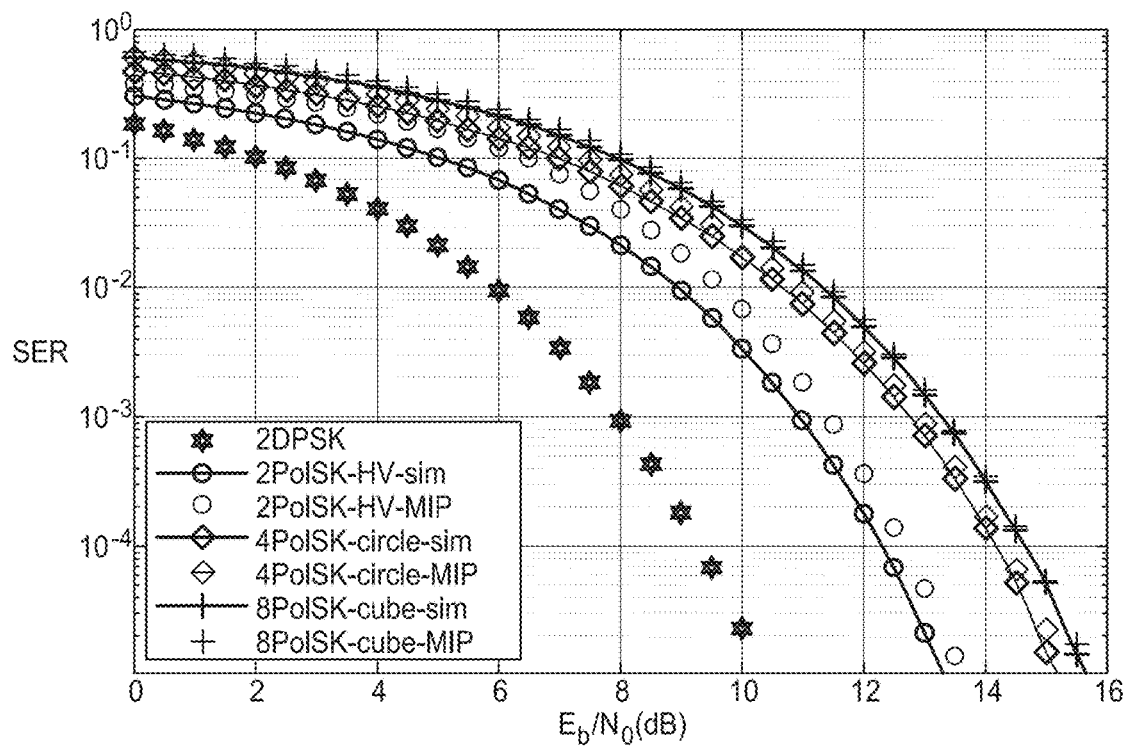
FIG. 7: SER for 2PolSK-HV, 4PolSK-circle, and 8PolSK-cube—simulation versus MIP bound.

Eqn. (10) indicates that ML estimation for normalized PolSK is (up to the Fisher approximation) equivalent to maximizing the inner product between the received signal and each constellation point—a criterion we shall call the maximum inner product (MIP) criterion. Using this simplified model, one can compute the resulting symbol error rate:

$$P_e = \frac{1}{M}\sum_{i=1}^{M}\left(1 - \iint_{DR_i} f(\theta, \phi \mid r_i, \theta_i, \phi_i)d\theta d\phi\right) \quad (11)$$

where M is the order of constellation, $f(\theta,\phi|r_i,\theta_i,\phi_i)$ is the conditional PDF for transmit polarization symbol $P^i$ shown in Eqn. (9), and $DR_i$ is the corresponding decision region under the MIP criterion. The decision region for 8PolSK under the MIP criterion is shown in FIG. 6, while FIG. 7 compares simulation results with the SER values computed from (11) for three different constellations—2PolSK-HV, 4PolSK-circle, and 8-PolSK-cube. We also include the SER for binary differential phase shift keying (2DPSK). Notice that it is reasonable to compare PolSK with 2DPSK since they both suffer the same amount of total noise. In 2DPSK, noise affects both the current signal and the previous reference signal, while in PolSK, noise affects both orthogonally polarized components. So $E_b/N_0 = E_s/N_0/\log_2 M$ stands for SNR/bit where $N_0$ is the noise variance for each orthogonally polarized component.

We briefly summarize the observations as follows:

The MIP bound provides a good approximation to the simulated performance for 4PolSK-circle and 8PolSK-cube. Moreover, comparing the MIP bound with a bound derived in "*Theory of polarization shift keying modulation*" by Benedetto et al. (*Communications, IEEE Transactions*, 40(4):708-721, April 1992) based on approximating the decision regions with cones, the MIP bound is approximately 1.0 dB tighter.

For 2PolSK-HV, the decision region implied by the MIP criterion is a half sphere which is exactly the same as the cone assumption. Ultimately, the MIP bound is looser in the binary case due to the use of the Fisher distribution in equation (9).

For PolSK, the polarization state is determined not only by the relative phase but also the amplitude ratio between orthogonally polarized components—explaining the 3 Db SNR penalty of 2PolSK compared with 2DPSK.

B. SER Performance of Rayleigh Fading Channel

Figure 8:
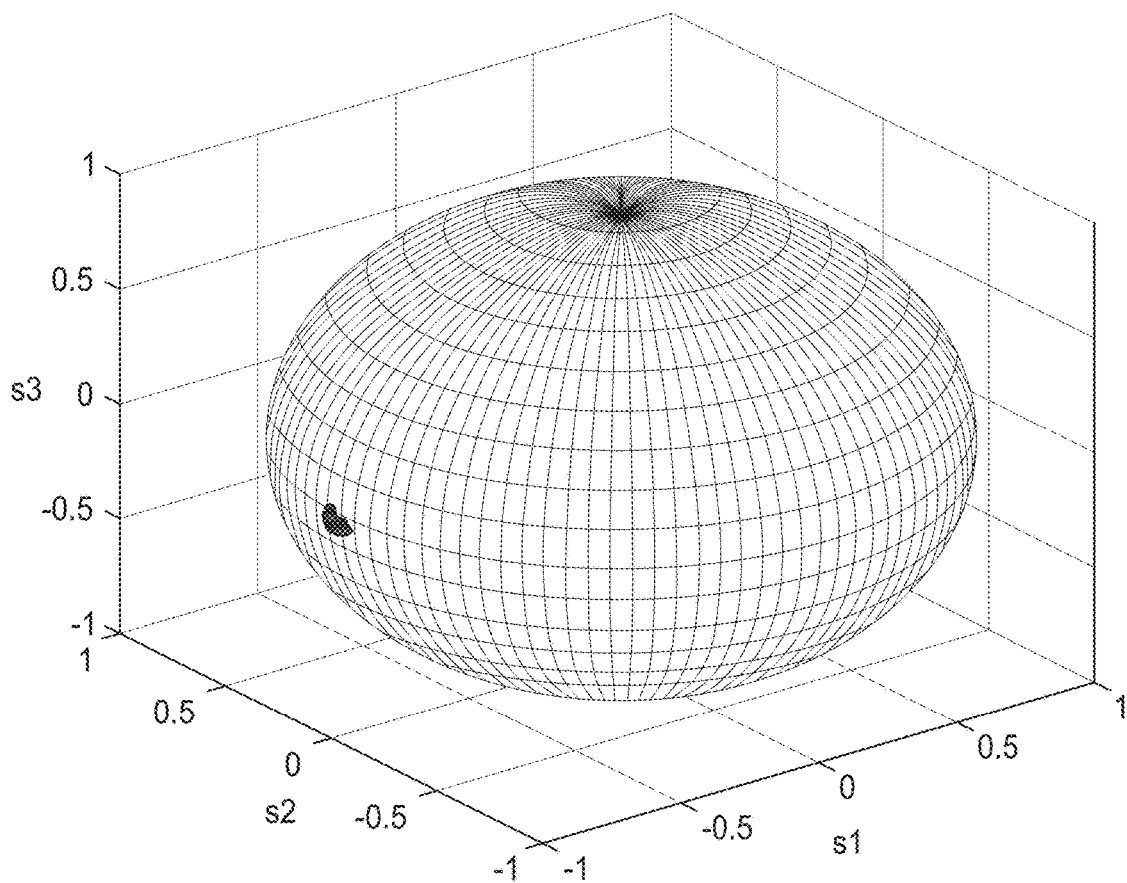
FIG. 8: Unbalanced DR for 2PolSK-HV under Rayleigh channel with $\mu=0.1$, $\chi=0.001$, $\delta_1=\delta_2=\sigma=\vartheta=0$, and $Eb/N_0=10$ dB.

In this section we assume each transmitted symbol is affected by independent Rayleigh fading—an assumption consistent with ideal interleaving. For the dual-polarized Rayleigh channel model in equation (4), the decision region implied by the normalized conditional PDF in (8) is unbalanced. The degree of imbalance is determined by the covariance matrix derived in equation (6). FIG. 8 illustrates this phenomenon for channel condition $\mu=0.1$ (low co-polar ratio), $\chi=0.001$ (low cross-polarization discrimination), zero polarization correlation, i.e., $\delta_1=\delta_2=\sigma=\theta=0$, and SNR/bit $E_b/N_0=10$ dB. The orange area is the decision region for V transmit polarization, and blue area is for H transmit polarization.

Figure 9:
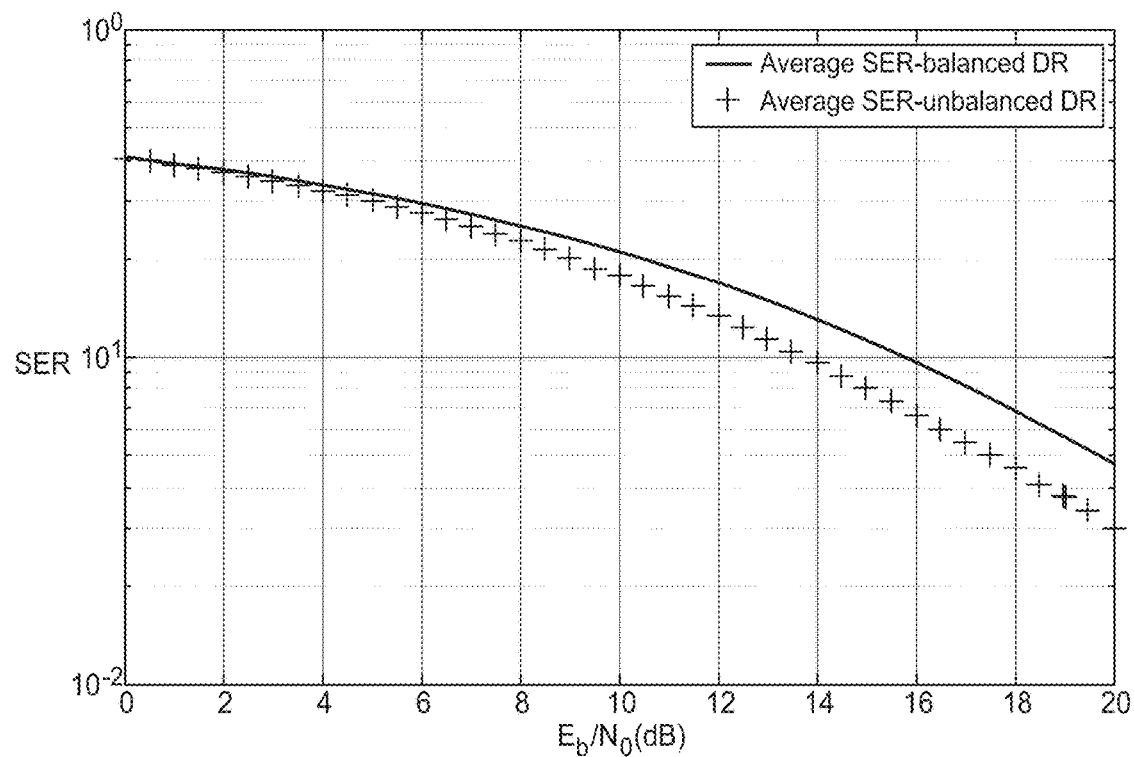
FIG. 9: 2PolSK-HV SER for no CSI and CSI under Rayleigh channel with $\mu=0.1$, $\chi=0.001$, $\delta_1=\delta_2=\sigma=\vartheta=0$.

The unbalanced decision regions represent a means of exploiting channel state information (CSI) at the receiver to improve the SER—i.e., rather than using the balanced decision regions implied by the AWGN channel, instead use the statistical CSI to customize the regions to the channel. FIG. 9 illustrates the resulting improvements for the same CSI values used to generate FIG. 8. Due to the low co-polar ratio $\mu=0.1$, hh channel suffers more power degradation. Therefore without CSI, the SER obtained when a V-polarized signal is transmitted is much lower than that obtained for an H-polarized signal. The average SER is equally weighted between H and V's SERs. However if we are aware of the statistical CSI through estimation, we can obtain the optimal unbalanced DR under ML criterion to achieve better average SER. Through observing curves in FIG. 9, we achieve almost 2 dB SNR/bit gain by exploiting the unbalanced DR under statistical CSI with $\mu=0.1$, $\chi=0.001$, and $\delta_1=\delta_2=\sigma=\theta=0$.

IV. Bounds Based on Mutual Information

The capacity of a channel is the supremum of all input/output mutual information values taken over all possible input distributions ("*Elements of Information Theory*" by Cover et al. (Wiley, 2012)). To explore the fundamental property of polarization-based signaling, we compute the mutual information for PolSK channels assuming equiprobable inputs.

The mutual information between transmit polarization $(r_s,\theta_s,\phi_s)$ and receive polarization $(r,\theta,\phi)$ on the Poincare sphere is given by $$I(r_s, \theta_s, \phi_s; r, \theta, \phi) = E\left[\log_2\left[\frac{f_{r,\theta,\phi|r_s,\theta_s,\phi_s}(r, \theta, \phi | r_s, \theta_s, \phi_s)}{f_{r,\theta,\phi}(r, \theta, \phi)}\right]\right] \quad (12)$$

Figure 10:
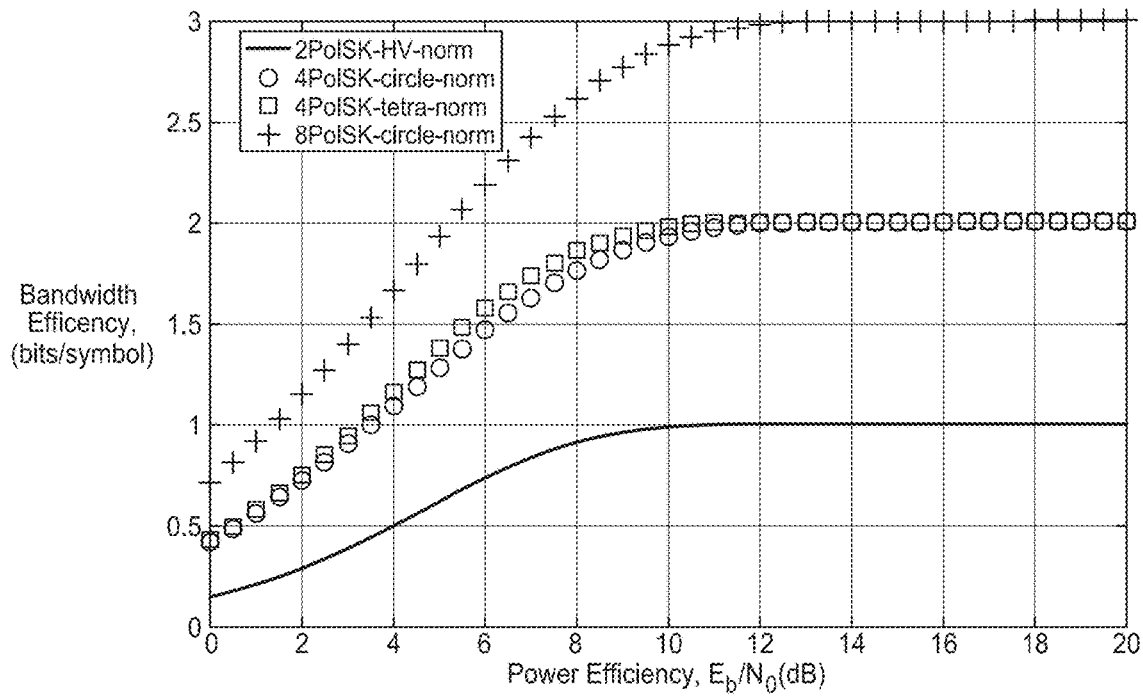
FIG. 10: Mutual information bound for AWGN channel.

FIG. 10 illustrates the bounds obtained by numerically integrating (12) assuming equiprobable inputs for the four PolSK constellations of interest assuming dual-polarized AWGN. As expected, M-ary signaling has a capacity that approaches $\log_2(M)$ as the SNR increases. Note also that for M=4 the tetrahedral constellation offers a slight improvement over the "circle" constellation comprising four symbols equidistant on the equator. Finally, the curves in FIG. 10 are computed using the normalized conditional PDF (i.e., $r_s=r=1$), but there is negligible difference with the results obtained for the unnormalized case.

Figure 11:
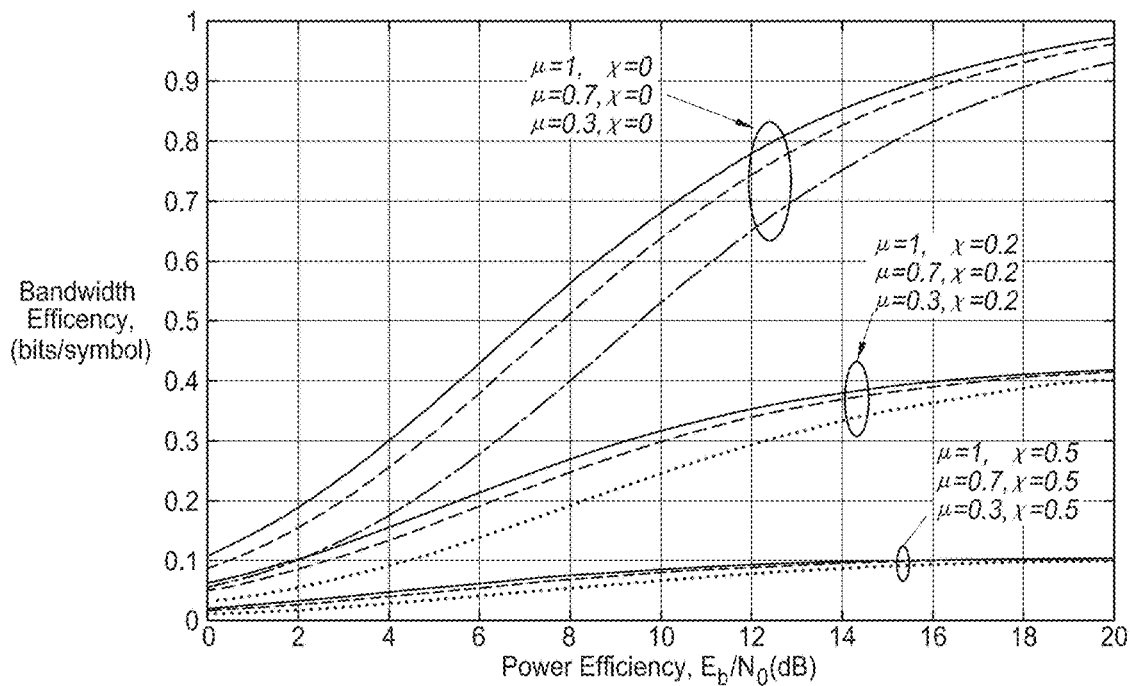
FIG. 11: Mutual information bound for Rayleigh fading—normalized PS case.

For the dual-polarized, i.i.d. Rayleigh channel, we first explore the channel's effect on the mutual information bound with normalized conditional PDF given in (8). Specifically, assuming 2PolSK-HV is used for signaling, FIG. 11 shows the effect of polarization power imbalance, i.e., co-polar ratio τ and cross-polarization discrimination on performance. (We assume zero polarization correlations.) From FIG. 11, we make these observations:

- Both cross-polarization discrimination $\chi$ and co-polar ratio $\mu$ play significant roles in the fundamental performance limits of 2PolSK-HV.
- Performance decreases with the increasing $\chi$, which can be explained by more severe depolarization, thus stronger power coupling from H to V and from V to H.
- Performance improvements with increasing $\mu$ which can be explained by smaller power imbalance between vv and hh channels.
- Since PolSK information is carried by the amplitude ratio and relative phase between H and V components, therefore the power coupling effect will be more significant than the power imbalance between vv and hh channels. Thus $\chi$ has greater effect on performance than $\mu$.

Figure 12:
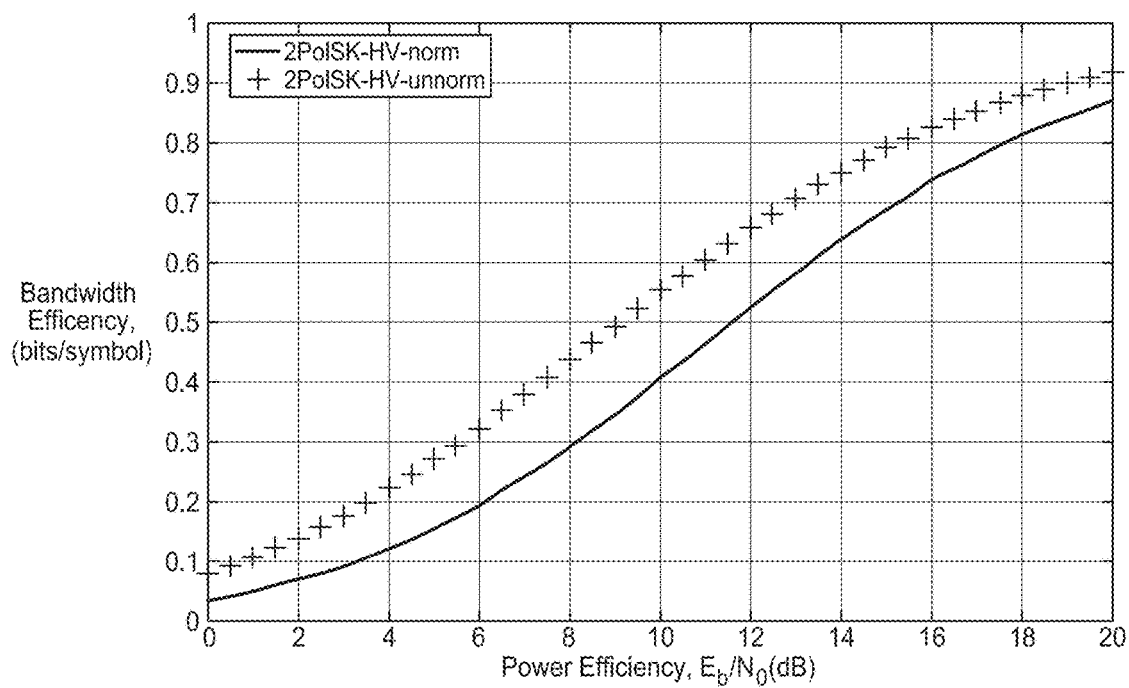
FIG. 12: Uniform capacity bound comparison between norm and unnorm under dual-polarized Rayleigh channel with $\mu=0.1$, $\chi=0.001$, $\delta_1=\delta_2=\sigma=\vartheta=0$.

While normalization had a negligible effect on the mutual information bounds for AWGN channels, the effect is more pronounced in Rayleigh fading, where a deep fade can move the received polarization state far away from the surface of the unit Poincare sphere. This is seen in FIG. 12, where it is shown that the mutual information for a particular set of channel parameters is significantly larger when the unnormalized conditional PDF is assumed compared with that obtained when the normalized conditional PDF is employed.

V. Symbol Error Rate (Ser) of Polarization-Based Signaling Assuming

Dual-Polarized Rayleigh Block Fading

This section extends the SER analysis of PolSK to a block fading scenario practical for indoor wireless communication and/or personal communication with terminals moving at walking speed [9]. For the dual-polarized Rayleigh block fading channel, the channel coefficients within each block are constant and the channel coefficients between blocks are drawn i.i.d. from the stationary dual-polarized Rayleigh channel modeled in equation (5). We distinguish between two different kinds of CSI in this scenario:

- Statistical CSI—which is to say the parameters of the underlying Rayleigh distribution—i.e., the co-polar ratio $\mu$, the cross-polarization discrimination $\chi$, and the correlation values.
- Instantaneous CSI—which is to say the actual realized channel, something that could be obtained through the use of pilots in the block.

When statistical CSI is used, then the same decision regions are used for every channel realization—the decision regions implied by the underlying distribution. By comparison, when instantaneous CSI is used, then new decision regions are computed for every block, based on the realized channel.

Figure 13:
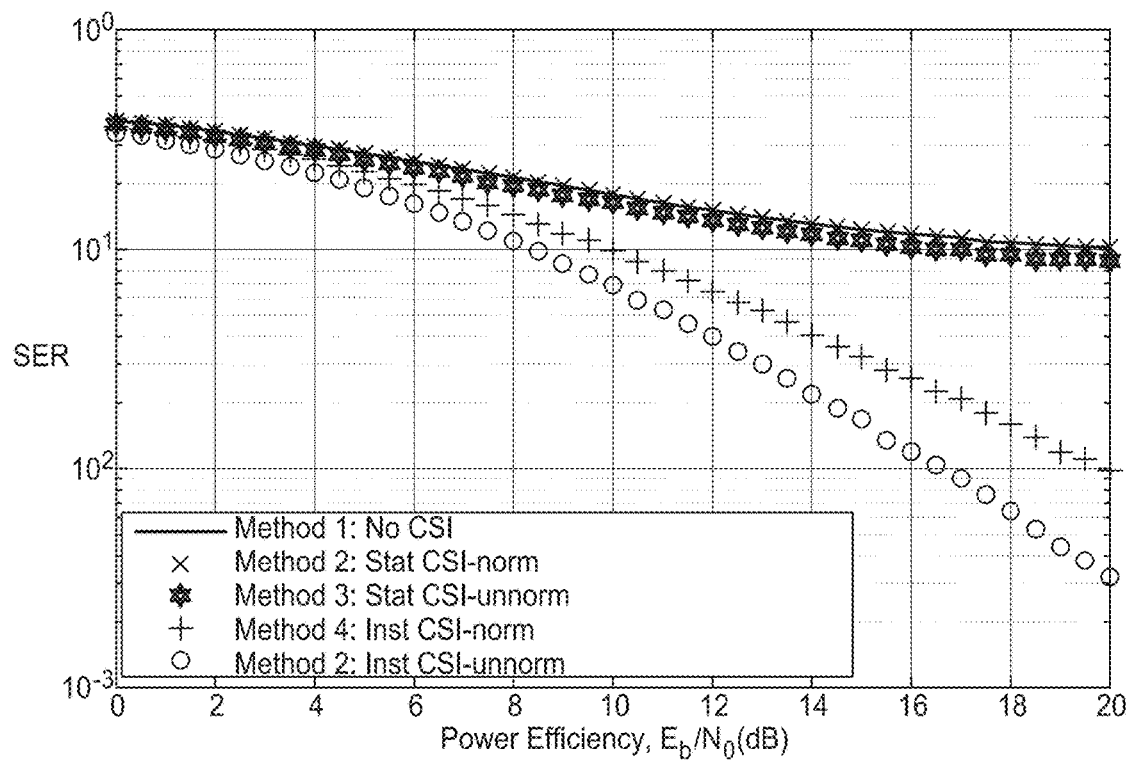
FIG. 13: SER of 2PolSK-HV assuming dual-polarized Rayleigh block fading channel with $\mu=0.5$, $\chi=0.1$, and correlation values $\delta_1=\delta_2=\sigma=\vartheta=0$.

Table I describes each of five "methods" that were simulated, characterized by what kind of CSI was exploited and whether the normalized or unnormalized conditional PDF was used to simulate the channel. FIG. 13 illustrates the resulting SER performance for 2PolSK-HV transmitted over a dual-polarized Rayleigh fading channel with co-polar ratio $\mu=0.5$, cross-polarization discrimination $\chi=0.1$, and correlation values $\delta_1=\delta_2=\sigma=\theta=0$.

TABLE I

Polarization-based signaling method

| | Stat/Inst CSI | norm/unnorm CPDF |
|---|---|---|
| Method 1 | X | X |
| Method 2 | Stat CSI | norm CPDF |
| Method 3 | Stat CSI | unnorm CPDF |
| Method 4 | Inst CSI | norm CPDF |
| Method 5 | Inst CSI | unnorm CPDF |

The following observations can be made from the results in FIG. 9:

Method 1, which does not exploit any CSI and uses balanced (half-sphere) decision regions, has the worst SER performance of any of those simulated.

Method 2 has almost the same performance as Method 1 because decision region calculated under statistical CSI and norm CPDF is almost the same as balanced decision region for this channel statistics.

Decision regions based on the unnormalized conditional PDF provide better performance than decision regions based on the normalized conditional PDF. This is because the fading affects received energy, and the unnormalized conditional PDF allows that effect to be accounted for.

Exploiting instantaneous CSI always provides better performance than exploiting statistical CSI.

VI. Conclusion

This section provided insights into the fundamental properties of polarization-based signaling. A new analysis of the (energy-normalized) dual-polarized AWGN channel led to a characterization of the maximum likelihood criterion based on maximizing the inner product of the Cartesian coordinates of the received and candidate signals; this formulation led to an improved bound on the resulting symbol error rate. It was demonstrated that normalizing received polarization states to the unit Poincare sphere has negligible effect for the dual polarized AWGN channel but significant effect for the dual polarized Rayleigh fading channel. Fundamental performance bounds based on numerically computing mutual information provided insight into both AWGN and Rayleigh fading channels; most notably, the effect of the Rayleigh statistics was quantified, showing that cross-polarization discrimination $\chi$ has a more significant effect on performance than co-polar ratio $\mu$. Finally, the relative benefit of exploiting instantaneous CSI at the receiver versus statistical CSI was evaluated.

The foregoing analysis shows results for narrowband systems, and these extend to sub-bands in multicarrier systems, which are contemplated for polarization and coherent signal modulation techniques.

Blind Carrier Frequency Offset (CFQ) Estimation

Multicarrier systems, in implementation, will be susceptible to some degree to carrier frequency offset estimation. In other words, frequency offsets, such as from the receiver local oscillator (LO) or the transmitter LO, will result in an offset between the transmitter and receiver, leading to intercarrier interference. In the following section, we show methods in PMD/CSD systems for carrier frequency offset estimation that can be applied to limit the need for preambles for CFO estimation.

Multi-carrier systems, such as Orthogonal Frequency-Division Multiplexing (OFDM) systems, are known to be sensitive to carrier frequency offsets, such as those arising from Doppler frequency shift and from relative local oscillator drift between the transmitter and the receiver. When frequency offsets exist between the signal generated at the transmitter and the signal processed at the receiver, the FFT operation leads to non-orthogonal subcarriers and ultimately to intercarrier interference that impacts system performance. The degree of interference imparted depends upon the magnitude of the frequency offset relative to the subcarrier spacing. A method typically applied to counter these effects is to estimate the carrier offset using phase information from a known sequence of transmitted preambles or pilot symbols and then to apply compensation prior to the FFT operation. Blind techniques that do not require pilots or preambles have also been proposed in literature, for example, techniques that monitor power levels in null subcarriers associated with OFDM signaling. In this section, we consider OFDM frequency offset estimation for a coherent dual-polarized (DP) transceiver. We propose an approach that operates blindly and without pilots on data subcarriers and takes advantage of coherence between the DP receiver ports as well as the received signal correlations in the polarization-frequency domain. The new approach for coherent signals (CS) is compared with a blind power-based null subcarrier technique based on measurements from both orthogonally-polarized channels. The CS method is found to outperform the power-based approach for the conditions considered in this paper. The approach provides lower estimation errors and can operate effectively at very low SNR. It has the additional advantages of not only being pilotless and blind, but also not requiring the use of null subcarriers. The method also allows for simple determination of offset ambiguities that are integer multiples of the subcarrier spacing. Due to the lower frequency offset estimates, the approach can lead to the use of more compact subcarrier spacings, and hence to increased spectral efficiencies. We describe the proposed method and provide numerical analysis results to demonstrate the efficacy of the approach.

1 Introduction

OFDM signaling employs the transmission of multicarrier signals that are orthogonal, a property that is typically achieved in practice through use of the Discrete Fourier Transform (DFT). This transform produces frequency subchannels that overlap in frequency, but that are orthogonal at the subcarrier center frequencies, leading to the potential for high spectral efficiencies. The technology has been adopted in communications standards and is widely considered in other applications. Some of the key benefits that have helped to escalate the popularity of OFDM include the following: 1) OFDM is generally regarded as spectrally efficient due to the way in which the subcarriers overlap and yet retain their orthogonal relationship; 2) Equalization of channel effects is easily accomplished within each subcarrier using a complex scalar; 3) OFDM can be implemented with efficient algorithms such as the IFFT (at the transmitter) and the FFT (at the receiver); 4) A cyclic prefix can be used to overcome multipath delay.

However, in practice, OFDM signal orthogonality is not preserved at the receiver, due largely to signal frequency offsets from local oscillator drift or Doppler frequency shifts imparted by the channel. These frequency offsets lead to intercarrier interference (ICI) at the output of the DFT, which impacts channel estimation and communications performance, effectively placing practical limits on the subcarrier spacings that can be used in OFDM systems. For many OFDM applications, small subcarrier spacings would be particularly desirable so that more data can be "packed" into a given bandwidth. This, for example, would enable higher spectral efficiencies in communications as well as improved signal processing gains for sensing applications where integration is applied across subcarriers.

Frequency offsets therefore provide a significant challenge to OFDM systems. Techniques for frequency offset estimation may be divided into those requiring training symbols (preambles, pilots, etc), and those that operate in a blind fashion. A prominent work among techniques with training symbols describes a maximum likelihood (ML) estimator using a training preamble with identical OFDM symbols. When the frequency offset varies with time, pilots must continuously be employed, leading to reductions in spectral efficiencies. Representative techniques have been proposed involving the use of periodically inserted pilots or the use of OFDM symbols with identical halves or multiple identical parts. The accuracy of CFO estimates impacts not only the subcarrier spacings that can be considered by an OFDM system, but it also impacts the quality of channel estimates that are feasible. Improved frequency offset estimates implies the possibility of tighter subcarrier spacings, improved channel estimates, and improved spectral efficiencies for similar ICI levels.

Blind methods operate without the aid of preambles/pilots and therefore add another level of efficiency. Different approaches have been considered in literature. Some methods leverage the redundancy in the cyclic prefix for ML estimation of the CFO. Other methods have leveraged channel statistics. For example, an ML estimator is described in "*ML estimation of carrier frequency offset for multicarrier signals in Rayleigh fading channels*," by Choi et al. (*IEEE Trans. Veh. Technol.*, Vol. 50, pp. 664-655, March 2001) that requires knowledge of the second-order statistics of the fading channel and noise. Techniques employing time-domain oversampling to leverage correlations for CFO estimation have also been proposed. The approach in "*Blind Estimation of OFDM Carrier Frequency Offset via Oversampling*," by Chen and Wang (*IEEE Transactions on Signal Processing*, Vol. 52, No. 7, July 2004, pp. 2047-2057) exploits the relationship between one set of samples and a second set of samples that lags by half of the sampling interval ("*Blind CFO Estimation for Zero-Padded OFDM over Underwater Acoustic Channels*" by Zhou et al.). The method assumes perfect sample synchronization (see Equations 3 and 4 within the paper), which in practice, is not easily achieved. Other researchers have taken advantage of null subcarriers for CFO estimation.

For example, Liu and Tureli ("*A high-efficiency carrier estimator for OFDM communications*," IEEE Commun. Lett., Vol. 2, pp. 104-106, April 1998) exploit null subcarriers in OFDM signaling for blind estimation methods based on power estimates. Extensions to multiple antenna architectures have also been considered in "*Multicarrier synchronization with diversity*," by Tureli et al. (*Proc. Veh. Technol. Conf.*, Atlantic City, N.J., October 1995, pp. 952-956), where multiple receive antennas are employed in a diversity scheme that takes advantage of null subcarriers.

Here, we propose and analyze a new method for CFO estimation for receiver systems that are phase-coherent across receiver channels. In Section 2, we introduce mathematical models associated with OFDM signals and MIMO propagation channels. Section 3.1 describes the null subcarrier approach associated with a dual-polarized system and Section CS Processing presents the signal processing algorithms associated with coherent signal processing. We consider the special case of a phase-coherent multi-port receiver and propose a CFO estimator. We introduce a dispersion length (DL) metric formed from the received coherent sequences (CS) associated with the multiple receiver ports. This DL reflects the combined impact of propagation effects and the frequency offset at the receiver. When frequency offsets exist, the resulting ICI at the output of the DFT leads to noisier dispersion measurements, and hence to longer DL's. We estimate the frequency offset by minimizing the dispersion length at the output of the DFT operation associated with data subcarriers. The method has the advantage of operating exclusively on data subcarriers (instead of preambles, pilots, or null subcarriers). Additionally, the approach can be applied on each OFDM symbol.

In Section 5, a simulation model is described and used to compare the performance of the CS estimation approach with the multi-antenna null subcarrier technique ("*Multicarrier synchronization with diversity*," by Tureli et al.) for CFO estimation. We find that the CS approach has the significant benefit of having much greater sample support than null subcarrier techniques, with approximately 4× the number of subcarriers, leading to reduced estimation delays for a given level of estimation performance. Application of the estimated frequency offset in compensator minimizes the ICI, enabling the use of smaller subcarrier spacings and improving channel estimates to achieve higher spectral efficiencies. We find that the approach leads to a robust frequency offset estimation technique that can operate in the presence of sample synchronization errors, at low SNRs and in frequency-selective channels. The simulation model is also applied to Doppler shift estimation when the LO is shared between the transmit and receiver systems. The Conclusions summarize the findings reported here.

2 System Model

Figure 14:
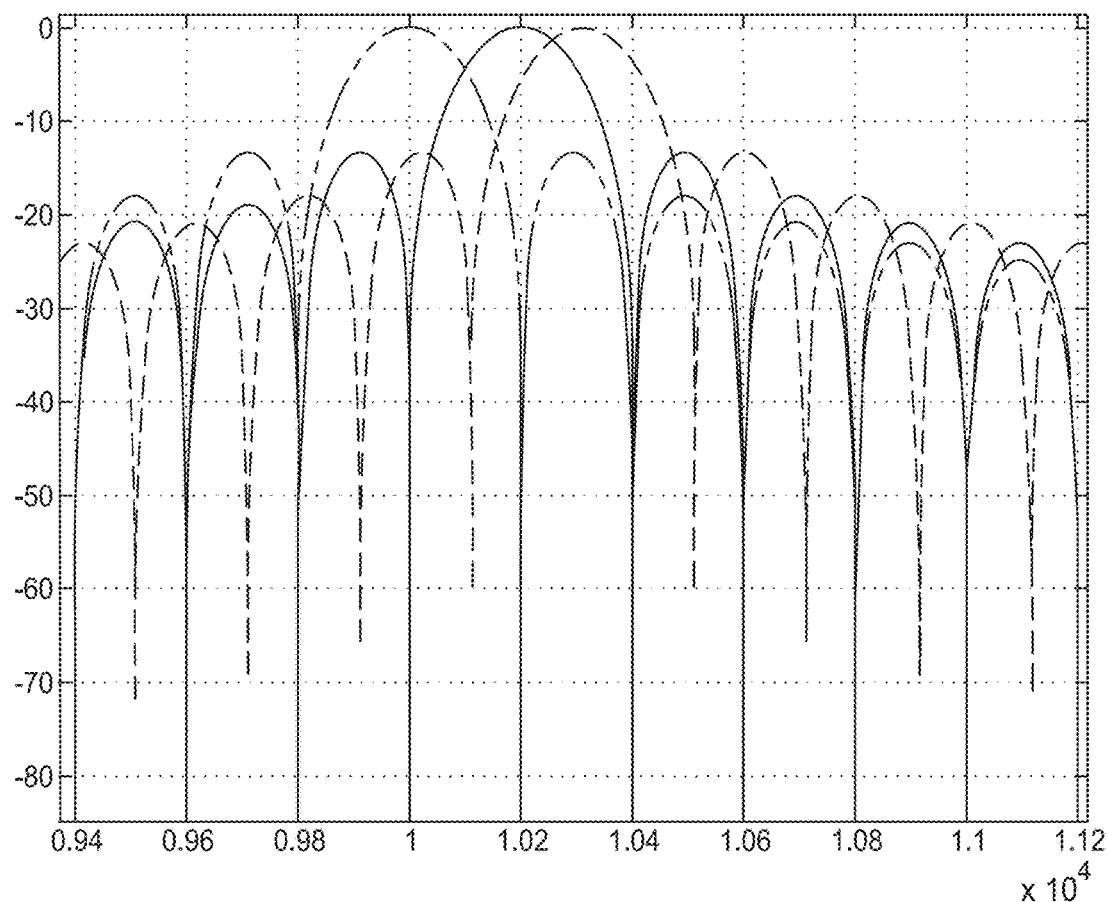
FIG. 14: Frequency offset.

The subcarrier signals comprising a transmitted OFDM symbol are orthogonal, which is usually achieved through the use of an inverse DFT. A cyclic prefix is typically also appended to each OFDM symbol to help overcome multi-path delay spread from the propagation channel. At the receiver, after symbol synchronization and removal of the cyclic prefix, an efficient form of the DFT is typically used to transform time domain blocks of samples from each OFDM symbol into frequency domain subcarriers. However, the received OFDM signals after the DFT may not necessarily preserve their orthogonal structure due to Doppler shift and/or relative local oscillator (LO) drift between the transmitter and receiver systems. When a frequency offset exists, the resulting transformed data are shifted in the frequency domain, which results in the loss of the orthogonal relationship between the original transmitted subcarriers as illustrated in FIG. 14. The figure shows two subcarriers (shown by the short-short-long dashed line and the solid line) at the transmitter that are orthogonal and exhibit a null at each of the subcarrier center frequencies. When a frequency offset exists at the receiver, the resulting subcarriers after the DFT are shifted, as exemplified by the subcarrier shown by the dashed line. Note that the frequency shifted signal is nonzero at the transmit subcarrier center frequencies, illustrating that the transmit subcarriers are no longer orthogonal at the receiver.

Figure 15:
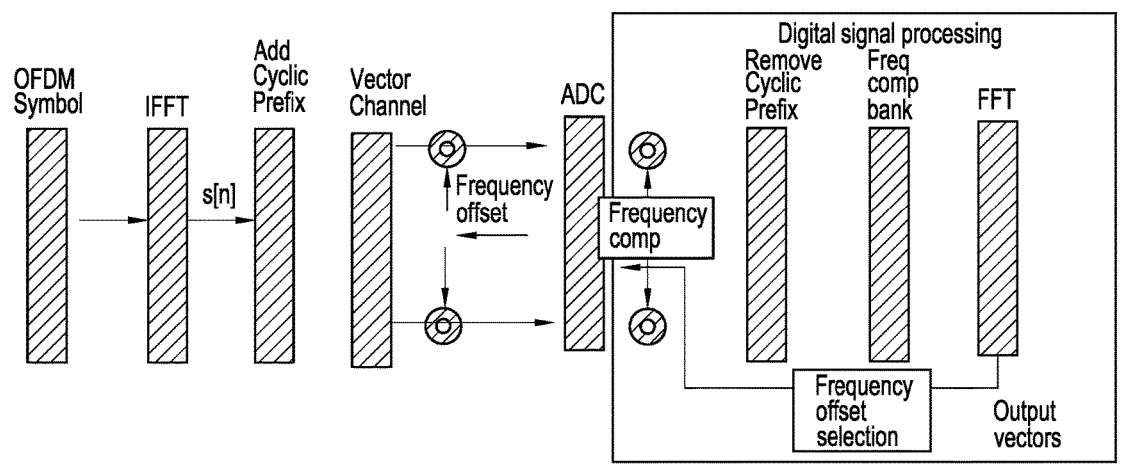
FIG. 15: System block diagram.

To address the problem of frequency offsets, communications standards such as IEEE 802.11a utilize preambles that can be exploited by a receiver to estimate phase differences between corresponding subcarriers in consecutive identical OFDM symbols ("*A technique for orthogonal frequency division multiplexing frequency offset correction*," by P. Moose, *IEEE Transactions on Communications*, Vol. 42, pp. 2908-2914; "*Robust frequency and timing synchronization for OFDM*" by Schmidl et al., *IEEE Trans. Commun.*, Vol. 45, pp. 1613-1621, December 1994). We propose an alternative solution that operates blindly, trains on the active subcarriers of each OFDM symbol, and is effective at low SNRs. The method does not require training symbols, but continuously operates in a blind fashion on received OFDM symbols to determine the offset and to compensate for the offset to minimize ICI. To find the frequency offset minimizing the ICI, the received time domain block of samples associated with each OFDM symbol is applied to a bank of frequency compensators, as indicated in FIG. 15. After Fourier Transformation of the entire bank of compensation offsets, dispersion lengths are monitored across the active subcarriers for each compensation vector, and the compensation offset leading to minimum DL is identified as the "fractional" frequency offset. The results are ambiguous to within an integer multiple of the subcarrier frequency spacing, and knowledge of the null subcarrier locations in the OFDM waveform can be used to resolve this ambiguity.

2.1 OFDM Waveform

Orthogonal frequency division multiplexing (OFDM) systems typically employ time-domain signals of the form $$s[n] = \sum_{k=1}^{N-1} A_k \cos(2\pi(f_c + f_k)nT + \phi_k) \tag{2.1}$$

$$n = 0, 1, 2, \ldots, N-1$$

where n is the sample index, N is the number of subcarriers, the $f_k$ are the subcarrier frequencies, and $d_k = A_k e^{j\phi_k}$ are the subcarrier symbols where the $A_k$ are the subcarrier amplitudes and the $\phi_k$ are the subcarrier phases. A cyclic prefix is typically added at the transmitter in order to accommodate channel delay spread, reducing associated intersymbol interference that would otherwise occur. For the subcarriers to be orthogonal, the $f_k$ must be integer multiples of ½T, where T is the symbol period of the data. Usually, the $f_k$ are chosen to be spaced apart by $R_s = 1/T$ and the $f_k$ are integer multiples of $R_s$.

For applications employing polarization-based architectures with coherent transmission, we represent the polarized time-domain transmitted OFDM symbol as:

$$\tilde{s}_p[n] = \sum_{k=0}^{N-1} A_k \begin{bmatrix} \rho_k^v \\ \rho_k^h \end{bmatrix} \cos\left(2\pi(f_c + f_k)nT + \begin{bmatrix} \phi_k + \phi_k^v \\ \phi_k + \phi_k^h \end{bmatrix}\right), \tag{2.2}$$

$$n = 0, 1, 2, \ldots, N-1$$

where the superscripts represent the orthogonally-polarized basis components associated with the transmit state, and where $(p_i^v)^2 + (p_i^h)^2 = 1$. In phasor notation, the polarized signal may be represented as $$s_p[n] = \begin{bmatrix} s_v[n] \\ s_h[n] \end{bmatrix} = \sum_{k=0}^{N-1} d_k \begin{bmatrix} \rho_k^v e^{j\phi_k^v} \\ \rho_k^h e^{j\phi_k^h} \end{bmatrix} e^{j2\pi f_k nT}, \tag{2.3}$$

$$n = 0, 1, 2, \ldots, N-1$$

The vector sequences associated with an N-length block for the OFDM symbol may be represented in the matrix $s \in R^{2 \times N}$ as:

$$s = \begin{bmatrix} S_v \\ S_h \end{bmatrix} = |s_p[0] \quad s_p[1] \quad \cdots \quad s_p[N-1]| \tag{2.4}$$

A cyclic prefix of length L would typically be applied to each sequence as a guard against inter-symbol interference arising from multipath delay spread.

2.2 Channel Model

A polarization-sensitive multipath wireless MIMO channel may be represented in the timedelay domain as:

$$H(t, \tau) = \begin{bmatrix} h_{vv}(t, \tau) & h_{hv}(t, \tau) \\ h_{vh}(t, \tau) & h_{hh}(t, \tau) \end{bmatrix} \tag{2.5}$$

$$= \sum_{n=1}^{N_p} \sqrt{P_n} \, H_n(t) \delta(\tau - \tau_n) \tag{2.6}$$

$$= \sum_{n=1}^{N_p} \sqrt{P_n} \left( \sum_{z=1}^{v_n} \overline{H}_{n,z} e^{i\omega_{n,z} t} + \tilde{H}_n(t) \right) \delta(\tau - \tau_n)$$

where H(t,τ) represents the time-varying baseband impulse response of the channel. We assume a finite impulse response model for the channel consisting of $N_P$ paths at fixed delays $\tau_n$ for n=1, ..., $N_P$ with normalized path gain matrices $H_n(t) \in C^{2 \times 2}$ and path power $P_n$ such that:

$$\sum_{n=1}^{N_P} P_n = 1. \tag{2.7}$$

A corresponding frequency-domain representation of the channel is given by:

$$H(t, f) = \sum_{n=1}^{N_p} \sqrt{P_n} \left( \sum_{z=1}^{N_n} \overline{H}_{n,z} e^{i\omega_{n,z} t} + \overline{H}_n(t) \right) e^{i2\pi f \tau_n} \tag{2.8}$$

where $\overline{H}_{n,z}$ and $\tilde{H}_n(t)$ correspond to the non-fluctuating and fluctuating components of the channel response. The details associated with this model can be found in "*Time-Domain Correlation-based Multipath Modeling of Wide-band Space-Polarization MIMO Channels*," by Talebi et al., *MILCOM* 2013, San Diego, Calif. November 2013, p. 1227-1232; "*Channel Sounding and Parameter Estimation for a Wideband Correlation-Based MIMO Model*," by Talebi et al., *IEEE Transactions on Vehicular Technology.*

2.3 Carrier Frequency Offset Model

Carrier frequency offsets bias the frequency-domain symbol subcarrier boundaries relative to those employed by the transmitter. This results in intercarrier interference (ICI) that impacts receiver performance. Frequency offsets are known to impact multi-carrier system performance, including digital modulation systems with implementations revolving around the use of the DFT. Frequency offsets will arise from Doppler shifts imparted by the channel or from local oscillator (LO) drift at either the transmitter or the receiver and result in non-orthogonal subcarriers out the output of the DFT, leading to ICI.

Frequency-offsets are typically dealt with through CFO estimation and subsequent application of the estimate in compensation processing, such as multiplication of the digitize signal by the conjugate of the CFO estimate. The quality of the estimator is important, as is the requirements needed to support its operation. Many approaches rely on the use of preambles and/or pilots, which consume spectral efficiency resources. Effective pilot designs will depend upon channel statistics, which often are not known or easily predicted. Blind techniques operate on the received signal without the need for known symbols or channel statistics, potentially leading to improved use of spectral resources and to robust operation without the need for channel-driven pilot designs.

Addressing frequency offsets is important in OFDM-based systems because they lead to nonorthogonal subcarriers and hence to ICI that impacts the performance of OFDM systems for communications, sensing, interference suppression, and other applications. Frequency offsets also place practical limits on the number of subcarriers that can be employed, since a given frequency offset will become a larger fraction of the subcarrier bandwidth as the number of subcarriers increases for a given bandwidth resource. A method that can effectively estimate and compensate frequency offsets would enable mitigation of ICI power levels, and therefore facilitate use of an increased number of subcarriers in OFDM symbols for improved spectral efficiency. Here, we propose a processing approach for blind estimation of the fractional frequency offset. For the analysis, a system model is developed that is suitable for coherent MIMO systems. The term "coherent" as used in this section refers to phase-coherent ports. The developed model is used to investigate frequency offset estimation techniques in frequency-selective channels and in the presence of sampling offsets.

The CFO estimation techniques considered in this work include null subcarrier power monitoring, the methods of Chen and Wang, and the use of coherent signal dispersion lengths.

A model for the received signal vector can be compactly represented in a modified form of the model provided in "Blind Estimation of OFDM Carrier Frequency Offset via Oversampling," by Chen and Wang, where in our case, we also consider sample synchronization error.

The time-domain samples of the received signal may be represented by $$X = [x_v x_h] = P(\phi_o) W E_s(\alpha) D + Z \tag{2.9}$$

where Z is a noise matrix of i.i.d. zero-mean bivariate Gaussian random variables and $D = [d_v \ d_h]$ represents the symbol vector at the receiver channels after propagation through the channel, with $$[d_v d_h] = \begin{bmatrix} d_1[\rho_v[1]\rho_h[1]H[1] \\ d_2[\rho_v[2]\rho_h[2]H[2] \\ \vdots \\ d_{N-1}[\rho_v[N-1]\rho_h[N-1]]H[N-1] \end{bmatrix} \tag{2.10}$$

The frequency offset and sampling offset are represented as $$P(\phi_o) = \text{diag}(1 e^{j\phi_o} \ \dots \ e^{j(N-1)\phi_o}) \tag{2.11}$$

$$E_s(\alpha) = \text{diag}\left(1 e^{j\frac{2\alpha\pi}{N}} \ \dots \ e^{j\frac{2\alpha(M-1)\pi}{N}}\right) \tag{2.12}$$

respectively, where $\phi_o = \Delta\omega T_s$ is a function of the frequency offset $\Delta\omega$. Here, $P(\phi_o)$ models the effects of the frequency offset, while $E_s(\alpha)$ models the effects of the sample synchronization error with $0 \le \alpha < 1$. The value $\alpha = 0$ corresponds to the absence of sample synchronization error, which is assumed in [14]. All other values correspond to nonzero sampling offsets.

In receiver signal processing, we employ frequency offset compensation, represented by $P(\phi)$, and compute the DFT.

$$Y(\phi) = \begin{bmatrix} y_1 \\ y_2 \\ \vdots \\ y_n \end{bmatrix} = \tag{2.13}$$

$$W^H P^H(\phi) X = W^H P^H(\phi) P(\phi_o) W E_s(\alpha) D + W^H P^H(\phi) Z$$

where $Y \in \mathbb{R}^{N \times 2}$.

3 Blind Carrier Frequency Offset Estimation

The result in the previous section can be used to analyze CFO estimation techniques, including null subcarrier power monitoring and CS DL monitoring.

3.1 Null Subcarrier Power Monitoring

For null subcarrier power monitoring, in the absence of noise (when Z is a matrix of zeros), sampling offsets ($\alpha = 0$) and frequency offset compensation ($\phi = 0$), if subcarrier index $\beta$ corresponds to a null subcarrier so that $d_\beta = 0$, then in the absence of frequency offset error, $y_\beta = [0 \ 0]$. In the presence of noise and frequency offset error, the estimation strategy is to find the frequency offset compensation that minimizes the energy in the null subcarriers, i.e., find $\phi_{min}$ such that $\sum_{\beta=1}^{J} |y_\beta(\phi)|^2$ is minimized over the unambiguous range of frequency offsets up to the subcarrier spacing, where J is the number of null subcarriers. Integer ambiguities are accommodated easily by noting the measured null subcarrier locations at the output of the DFT. The βth null subcarrier output may be represented as:

$$y_\beta(\phi) = w_\beta^H P^H(\phi) x = w_\beta^H P^H(\phi) P(\phi_o) W E_s(\alpha) d \pm w_\beta^H P^H(\phi) z \tag{3.1}$$

where $w_\beta$ corresponds to the βth row of W.

3.2 Oversampling

Chen and Wang have proposed the use of oversampling, for example by a factor of 2, in order to exploit the correlation between the resulting two sample streams, $x_1 = PWD + Z_1$ and $x_2 = e^{j\phi/2} PWED + Z_2$ where the sampling instances for the two sequences are offset by one-half sample relative to each other and the noise processes are assumed to be independent. The CFO estimate is given by:

$$\hat{\phi} \text{argmax} Q(\phi) = y_1^H y_2 + y_2^H y_1 \tag{3.2}$$

where $$y_1 = W^H p^H x_1 \tag{3.3}$$

$$y_2 = e^{-j\frac{\phi}{2}} E^H W^H p^H x_2 \tag{3.4}$$

where W comprises the M columns of the N-length DFT matrix corresponding to data subcarriers:

$$W = \frac{1}{\sqrt{N}} \begin{bmatrix} 1 & 1 & \ldots & 1 \\ 1 & e^{j\omega} & \ldots & e^{j\omega(M-1)} \\ \vdots & \vdots & & \vdots \\ 1 & e^{j(N-1)\omega} & \ldots & e^{j\omega(M-1)(N-1)} \end{bmatrix}, \quad (3.5)$$

Also, $$E = diag\left( 1 \quad e^{j\frac{\pi}{N}} \quad \ldots \quad e^{j\frac{(M-1)\pi}{N}} \right) \quad (3.6)$$

$$P = diag( 1 \quad e^{j\phi} \quad \ldots \quad e^{j(N-1)\phi} ). \quad (3.7)$$

3.3 Coherent Signal Dispersion Length

The proposed method for estimating CFO when a multi-port coherent receiver is employed involves exploiting the coherence of the response across subcarriers. The discussion here will focus on polarization representations, but are extendable to any pair of coherent signals.

The technique involves measuring and exploiting the polarization state of the received signal at each subcarrier frequency. Let $y_v$ and $y_h$ represent N-length blocks of samples on the orthogonally-polarized receive ports. The sampled signals at the receiver may be represented as the linear convolution of the transmitted signal with the vector channel impulse response:

$$\tilde{y}_p = \begin{bmatrix} y_v \\ y_h \end{bmatrix} = \begin{bmatrix} s_v * h_{vv} + s_h * h_{hv} \\ s_v * h_{vh} + s_h * h_{hh} \end{bmatrix}_N \quad (3.8)$$

where $[x*y]_N$ corresponds to the length-N central portion of the linear convolution of the sequences x and y. The corresponding frequency domain response at subcarrier k is given by:

$$\tilde{Y}_p[k] = \begin{bmatrix} Y_v[k] \\ Y_h[k] \end{bmatrix} = \begin{bmatrix} S_v[k]H_{vv}[k] + S_h[k]H_{hv}[k] \\ S_v[k]H_{vh}[k] + S_h[k]H_{hh}[k] \end{bmatrix} \quad (3.9)$$

$$= S[k] \begin{bmatrix} A_v[k]e^{j\phi_v[k]}H_{vv}[k] + A_h[k]e^{j\phi_h[k]}H_{hv}[k] \\ A_v[k]e^{j\phi_v[k]}H_{vh}[k] + A_h[k]e^{j\phi_h[k]}H_{hh}[k] \end{bmatrix} \quad (3.10)$$

$$= A_h[k]e^{j\phi_h[k]}S[k] \begin{bmatrix} \frac{A_v[k]}{A_h[k]}e^{j(\phi_v[k]-\phi_h[k])}H_{vv}[k] + H_{hv}[k] \\ \frac{A_v[k]}{A_h[k]}e^{j(\phi_v[k]-\phi_h[k])}H_{vh}[k] + H_{hh}[k] \end{bmatrix} \quad (3.11)$$

The frequency-dependent polarization may be expressed in terms of a Stokes vector P $$P[k] = \begin{bmatrix} Y_v[k]Y_v^\dagger[k] + Y_h[k]Y_h^\dagger[k] \\ \hat{P}[k] \end{bmatrix} = \begin{bmatrix} Y_v[k]Y_v^\dagger[k] + Y_h[k]Y_h^\dagger[k] \\ Y_v[k]Y_v^\dagger[k] - Y_h[k]Y_h^\dagger[k] \\ 2\mathrm{Re}\{Y_v[k]Y_h^\dagger[k]\} \\ -2\mathrm{Im}\{Y_v[k]Y_h^\dagger[k]\} \end{bmatrix} \quad (3.13)$$

However, when a frequency offset exists, the subcarriers are not orthogonal, and the polarization estimates will be correspondingly corrupted by inter-carrier interference (ICI).

Note that equation 3.13 provides the polarization state estimate as a function of subcarrier. We note that when this signal is represented on a Poincare sphere that the relative spread of the signature is directly related to the measurement noise. Hence, nonzero ICI will tend to increase the noisiness of the curve, and in the absence of noise the spread of the curve will be minimized when the frequency offset is zero. A measure to quantify this spread is the dispersion length, defined as:

$$L = \sum_{k=2}^{N} |\hat{P}[k] - \hat{P}[k-1]|^2, \quad (3.14)$$

which is proportional to the length of the dispersion curve.

4 Channel Estimation

In the presence of time offset and frequency offset, the received signal at the output of a correlator is given by:

$$Y_s[k\Delta\omega] = \quad (4.1)$$

$$e^{-jk\Delta\omega\left(\delta t + \frac{\pi}{\Delta\omega}\right)} \sum_{i=\frac{N}{2}}^{\frac{N}{2}-1} X_s[i\Delta\omega]H[i\Delta\omega]\mathrm{sinc}\left(\frac{k\Delta\omega - i\Delta\omega - \delta\omega}{\Delta\omega}\right) + N_s[k\Delta\omega]$$

Assuming zero-forcing for channel estimation, in the absence of timing offset and with negligible noise, the channel estimate is formed using $$\hat{H}[k] = \frac{e^{-jk\pi} \sum_{i=\frac{N}{2}}^{\frac{N}{2}-1} X_s[i\Delta\omega]H[i\Delta\omega]\mathrm{sinc}\left(\frac{k\Delta\omega - i\Delta\omega - \delta\omega}{\Delta\omega}\right)}{X_s[k]} \quad (4.2)$$

We illustrate improvements in the channel estimates due to frequency offset improvements for different block lengths. To emphasize the impact of frequency offset errors, we have neglected noise. The results show that the MSE of the channel estimate is a function of the normalized CFO. Hence, one motivation for improving frequency offset estimation is to improve channel estimates for a given OFDM block length.

5 Simulation Results

To quantify CFO estimation performance, we compute a normalized CFO that scales the frequency offset relative to the subcarrier spacing. The measure is given by:

$$NMSE = \frac{1}{M_c} \sum^{k=1} M_c\left(\frac{\phi - \hat{\phi}}{\omega}\right) \quad (5.1)$$

where $\phi=2\pi\Delta f T_s$, $\hat{\phi}$ is the CFO estimate, $T_s$ is the symbol interval, $\omega=2\pi/N$, and $M_c$ is the number of Monte Carlo runs.

Figure 16:
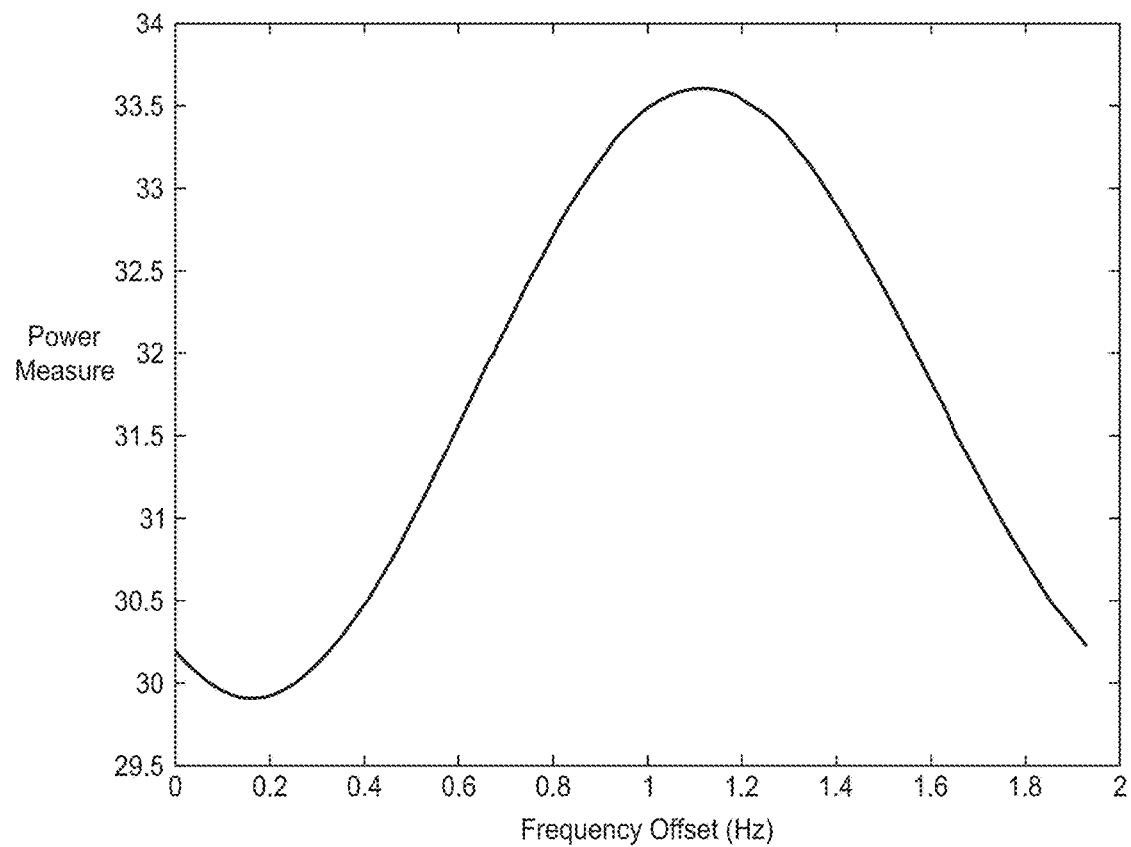
FIG. 16: Power measurement versus estimated frequency offset for a 10 dB SNR signal with a CFO of 1100 Hz.

Using the models described above, we compare the performance of three blind estimators, all based on the processing architecture shown in FIG. 15. Common processing among the architectures involves sampling the vector channel and then digitally applying compensation to an N-length block for a set of uniformly-spaced frequency offsets spanning the subcarrier spacing using a bank of compensation filters with offsets $P(\phi_1) \ldots P(\phi_M)$. After the sample block of data is compensated by the various frequency offsets, a Fast Fourier Transform (FFT) is applied to each frequency-compensated version of the sample block. At this point in the processing the algorithm diverges, depending upon whether the null subcarrier method, the over sampling method, or the dispersion length method is employed. For the null carrier technique, the power level in null subcarriers is summed for each of the frequency offset data used in the compensation filters. The frequency offset leading to the lowest power in the null subcarriers is selected as the frequency offset estimate. Any subset of null subcarriers within an OFDM symbol can be monitored, including those that typically exist just outside the spectral occupancy of the OFDM signal, those subcarriers nulled at DC, and any intentionally nulled data subcarriers. We consider the null subcarriers outside the spectral occupancy of the active OFDM subcarriers, which typically represents about 20% of OFDM subcarriers. For the selected set of null subcarriers, we sum the powers from the multiple coherent ports and this sum is compared across all frequency offsets. An example of the resulting power measurement versus estimated frequency offset is shown in FIG. 16 for a 10-dB SNR signal with a 1100 Hz frequency offset. The simulation conditions are summarized in Table 1 and include a channel exhibiting a 150-ns delay spread, an OFDM sample rate of 20 MHz, an FFT block length of N=1024, a subcarrier spacing of approximately 19,500 Hz, and processing associated with a single OFDM symbol. Note that a minimum occurs around 1650 Hz, leading to a 550 Hz frequency offset estimation error.

For the oversampling method, two sequences, one-half sample out of phase, are used to compute a CFO estimation metric for each output from the frequency offset compensation bank. The metric is computed for two conditions: in the first the noise samples are uncorrelated, and in the second the noise samples are completely correlated. The correlation of the noise in implementation will fall somewhere between these bounds, and hence the results provide useful performance bounds.

Figure 17:
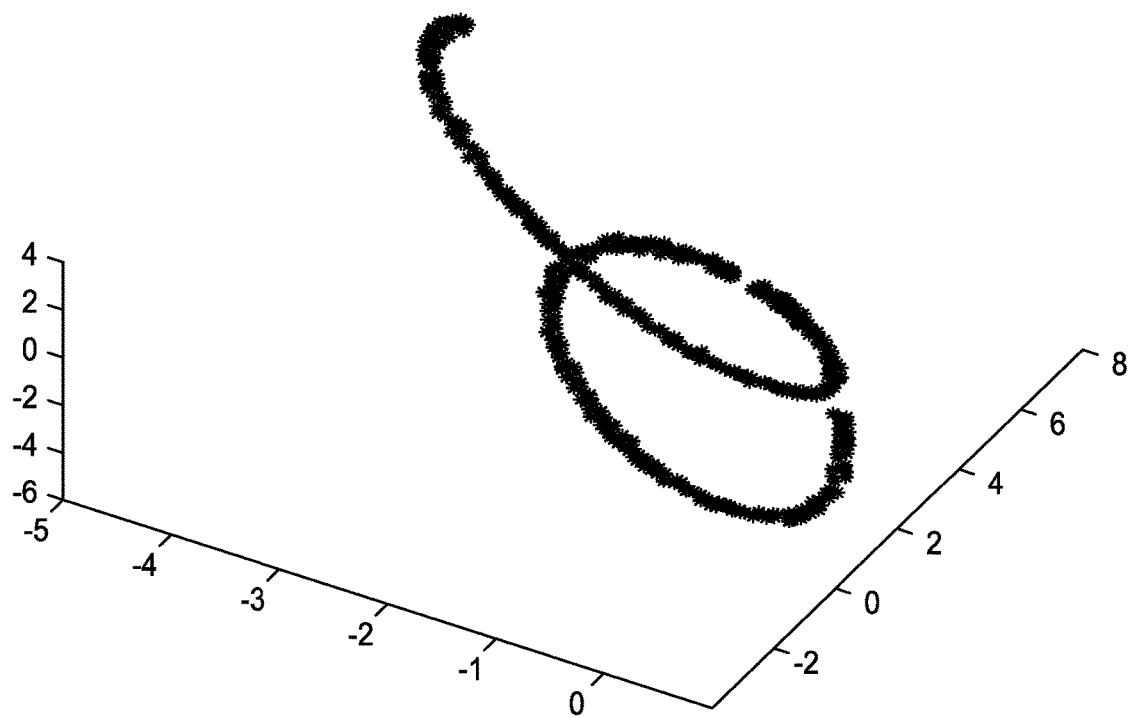
FIG. 17: Dispersion curve for zero frequency offset.
Figure 18:
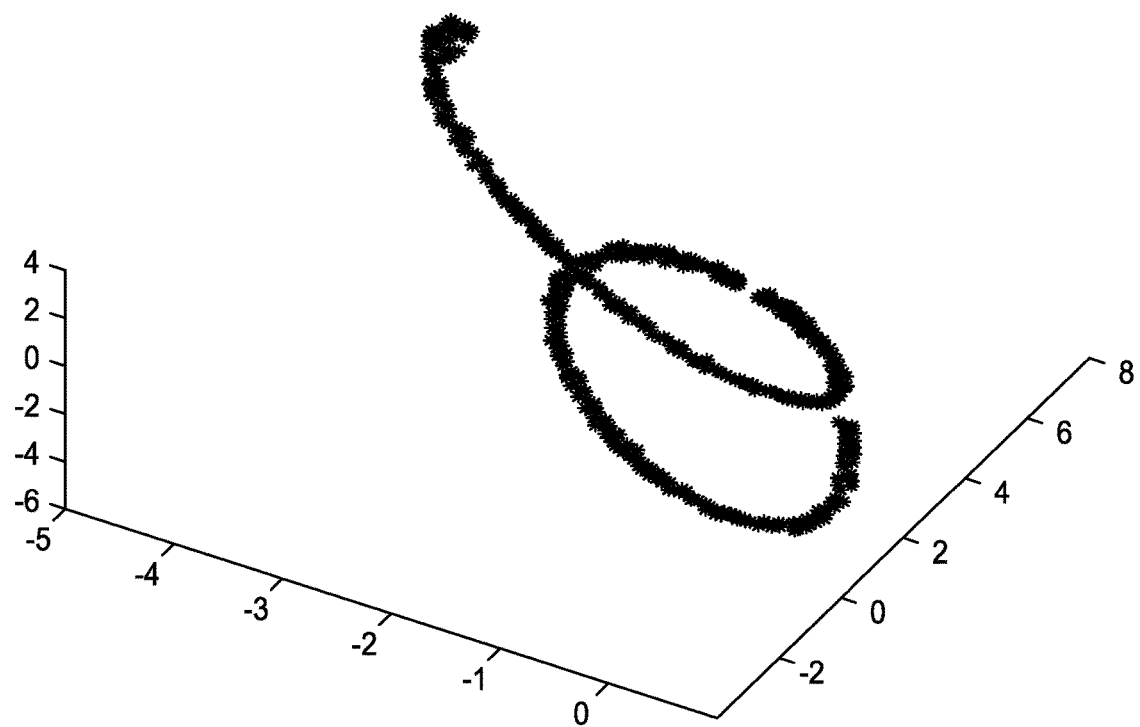
FIG. 18: Dispersion curve for a 100 Hz frequency offset.

For DL processing, dispersion curves derived from the subcarrier polarization state estimates are formed for each frequency-compensated version of the sample block, and the dispersion lengths are computed according to Equation 3.14. Examples of dispersion curves for the case with and without a frequency offset is shown in FIGS. 17 and 18 for a received signal with approximately 30 dB SNR (for illustrative purposes). Note that the properly compensated curve exhibits visibly less noise than the curve associated with a 100 Hz frequency offset. This is the behavior that we exploit through use of a dispersion length measure.

TABLE 5.1

Simulation Parameters

| Description | Parameter | Value |
| --- | --- | --- |
| Signal to Noise Ratio | SNR | 0 dB to 30 dB |
| Cyclic Prefix Length | $N_{Prefix}$ | 64 |
| Subcarrier Spacing | $\Delta f$ | 19 kHz |
| Number of Null Subcarriers | J | 206 |
| Compensation filter bank | $\Delta f_{comp}$ | 1 Hz |

TABLE 5.1-continued

Simulation Parameters

| Description | Parameter | Value |
| --- | --- | --- |
| resolution | | |
| OFDM Block Size | N | 1024 |
| Sample Rate | $R_s$ | 20 MHz |
| Number of OFDM Symbols | K | 1 |
| Cross Polarized Power Ratio | XPD | 0 dB |
| Number of taps in CIR | $N_{CIR}$ | 1 to 8 |
| Channel coefficients (V) | $h_v$ | $N_{CIR}$ random complex coefficients |
| Channel coefficients (H) | $h_h$ | $N_{CIR}$ random complex coefficients |

Figure 19:
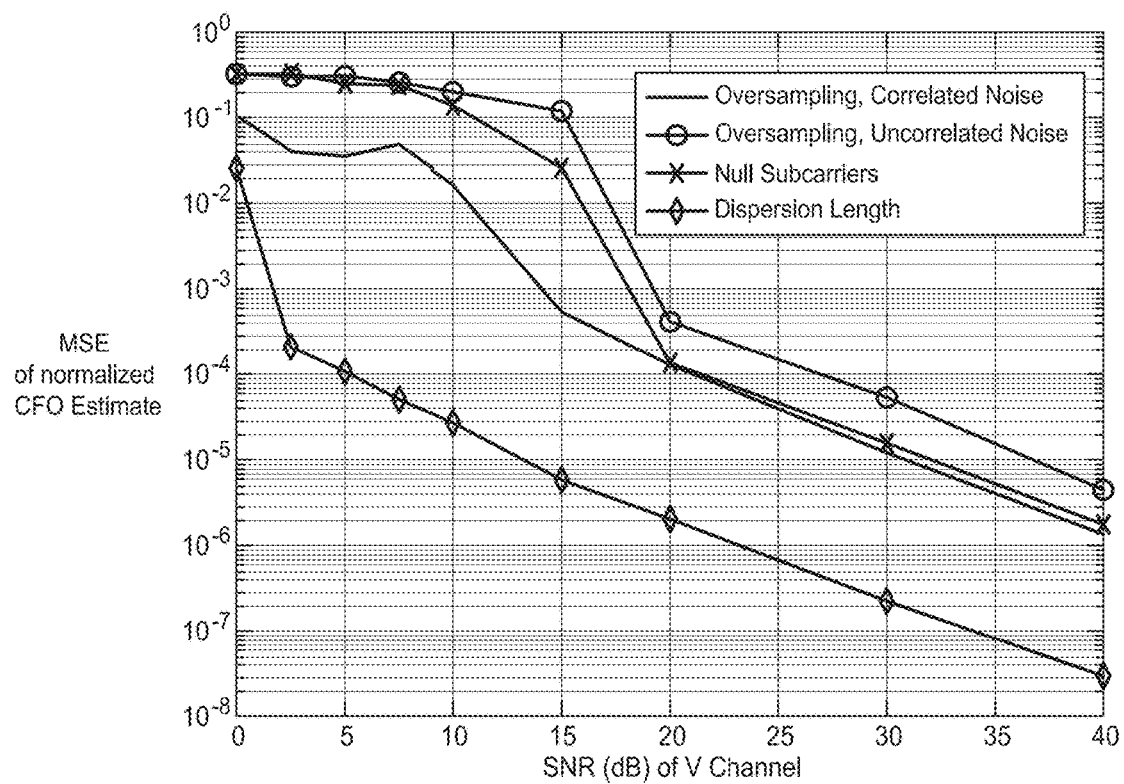
FIG. 19: Dispersion curve for a 100 Hz frequency offset.

A performance comparison of the three techniques is provided in FIG. 19. The results indicate a dramatic performance improvement with the DL technique in comparison to the other blind approaches. We point out that the DL approach neither requires oversampling nor reliance on a limited set of subcarriers, but instead requires a coherent multi-port receiver and employs processing of data subcarriers, where the symbols do not have to be known. Since ratios between the coherent channels is employed, the approach is insensitive to sample offsets, and with an appropriate cyclic prefix design, the approach is also suitably insensitive to symbol synchronization offsets.

6 Conclusions

The DL approach for estimating CFO offers a number of advantages, including the following: it does not require a preamble or pilots, i.e., it is a blind estimator. With the method, dispersion lengths are computed from the outputs o a frequency compensation bank to estimate the frequency offset. The method can be performed on each OFDM symbol, therefore enabling CFO tracking and likely much smaller errors than are reported herein. We provide CFO estimation performance associated with a single OFDM symbol. The method also has the advantage of making use of data subcarriers, which provides greater sample support than techniques relying on null subcarriers, and the method performs well even at low SNR. Although not investigated, extensions to an arbitrary number of coherent channels (e.g., beams, space, polarization, etc), are contemplated. Moreover, the outputs from each coherent pair can be leveraged to further improve the CFO estimation performance.

The improved CFO estimates enable tighter packing of subcarriers in the presence of frequency offsets, which could lead to a number of practical benefits, including the following (to be verified):

For a 5-fold increase in subcarriers, there will be a 5-fold reduction in the number of cyclic prefix samples, thereby improving spectral efficiency.

Tighter subcarriers implies narrower bandwidths for each subcarrier and hence longer coherence times, resulting in symbols that are less susceptible to multipath delay spread.

A general rule of thumb is that the multipath impacts are considered to be "flat" instead of "frequency-selective" when the symbol duration is at least 10 times the delay spread.

The improved tolerance to multipath should also mean that the number of samples used in the cyclic prefix can be reduced.

The longer subcarrier symbol durations may result in improved signal-to-noise ratios, which implies benefits in terms of modulation constellations, range, and BER performance improvements.

Analog Space-Polarization Modulation

As discussed herein, the transmitter 410 and receiver 420 illustrated in FIG. 4 can be used to carry out digital modulation communication schemes. However, the system can also be used to transmit and receive data using analog modulation schemes. In some embodiments, this is accomplished by encoding an image in analog PSD or CSD information. Each image "pixel" can be represented as a polarization or coherence state at a particular frequency sub-band of the transmitted signals. This can be accomplished because the transmitter 410 can generate signals having any arbitrary PMD or CSD response as a function of frequency sub-band.

Figure 20:
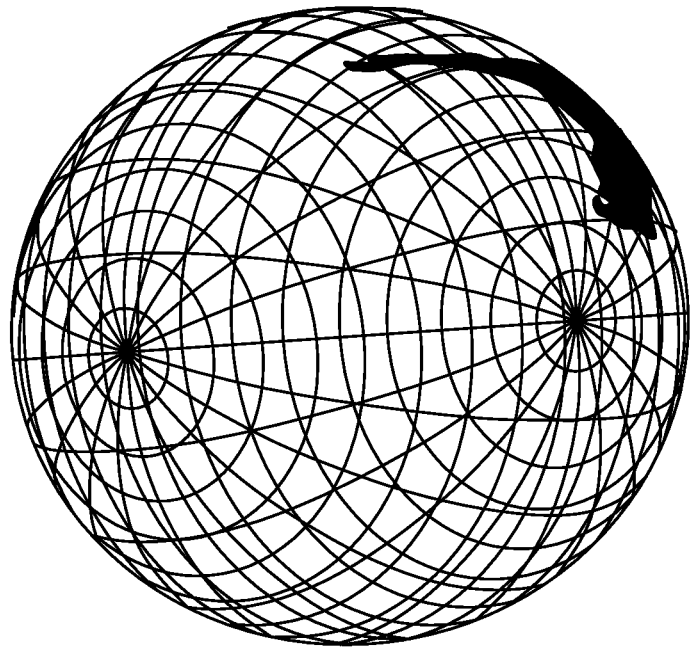
FIG. 20 illustrates an example of an analog image encoded in polarization or coherence states for different frequency sub-bands on a spherical manifold.
Figure 20:
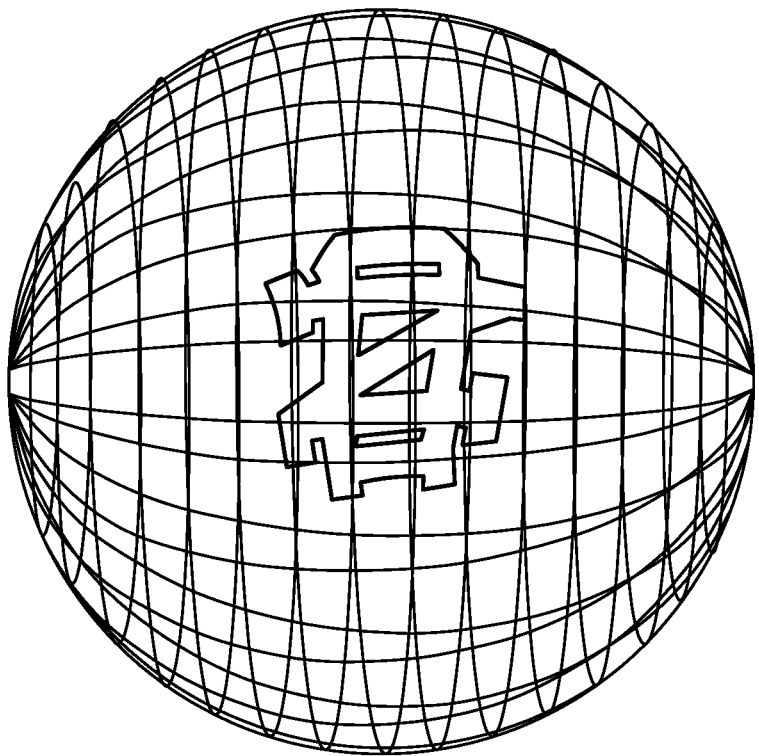

FIG. 20 illustrates an example of an analog image encoded in polarization or coherence states for different frequency sub-bands on a spherical manifold. The analog image is shown in the left-hand frame of FIG. 20 and, in this particular case, is a line drawing representation of the University of Notre Dame's logo. A method to carry out transmission of an analog image using PMD or CSD information can begin by first mapping each "pixel" of the image to analog coordinates on a manifold corresponding to a selected pair of transmit signals. Once the image pixels have been mapped to the analog coordinates on the manifold, those coordinates can be used to modulate the polarization or coherence states of the frequency sub-bands of the transmit signals. The image can be stationary in time on the manifold, or the PMD or CSD information for the transmitted signals can change over time so as to cause the image to rotate or translate across the manifold in any arbitrary way.

The receiver 420 can detect the transmitted signals and calculate the polarization or coherence states of the frequency sub-bands of the signals using the techniques described herein. Once the receiver plots the calculated PMD or CSD responses on the manifold, the transmitted analog image is recovered. The image may be distorted by channel effects. However, it may be possible to use image processing techniques to perform channel equalization so as to recover the original transmitted image.

Some of the benefits of this analog modulation scheme are that for some channels such as line-of-sight (LOS) links, data can be communicated without requiring preambles, pilots, channel estimation, frequency offset estimation, or sample synchronization. If frequency offset estimation is required, the blind methods described herein can be applied.

This analog image modulation technique may also exhibit a low probability of being intercepted. This is because the analog image can be relatively distortion free when transmitted via a line of sight (LOS) link. Again, this is represented by the left-hand frame of FIG. 20. In contrast, if the analog image is not transmitted via a LOS link or is received via the transmit antenna sidelobes, channel effects can distort the received polarization or coherence states, which in turn distorts the image and makes interception difficult. This is shown in the right-hand frame of FIG. 20 where the same Notre Dame logo is transmitted to the receiver via a side lobe of the main beam of the antennas and significant distortion is noted.

Symbol Integration

In the technique for communicating data using PMD or CSD responses to encode analog images, each image pixel corresponds to the analog polarization or coherence state of a particular frequency sub-band of the transmitted signals. The timing at which each image pixel is detected by the receiver does not affect the receiver's ability to decode the image. Thus, such analog images can be integrated at the receiver over any period of time during which the channel remains relatively stable. But the image components should only be integrated over the times when the signal components are transmitted to maximize the signal-to-noise ratio. This capability allows data symbols, such as these analog images, to be transmitted repeatedly and possibly disjointedly over time at relatively low data rates and at relatively low power levels because integration can make up for the relatively poor signal-to-noise ratios that result from low power levels. The ability to communicate at lower power levels and with slower speeds allows for more effective sharing of valuable spectrum resources.

Figure 21:
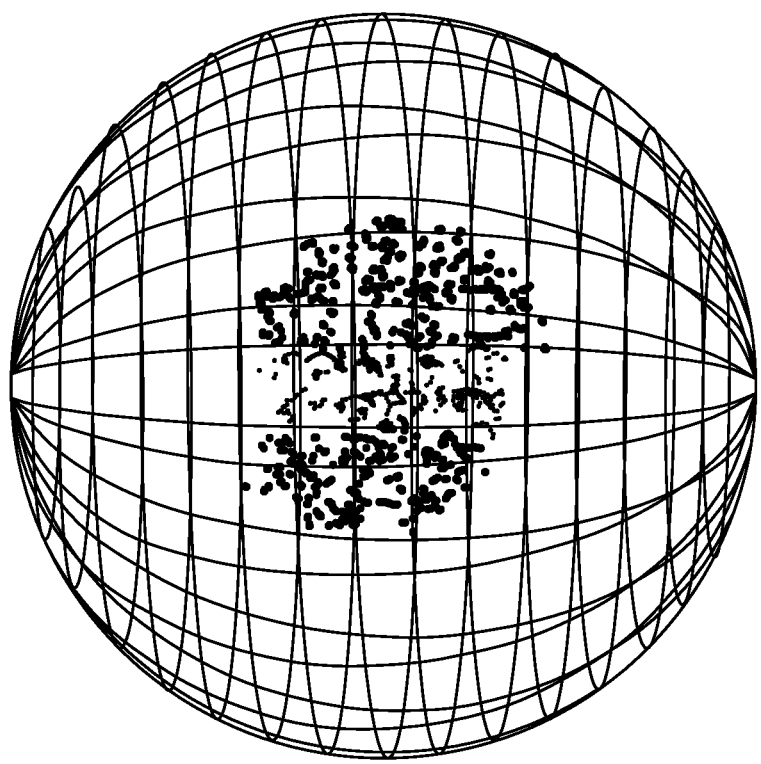
FIG. 21 illustrates the same analog image of FIG. 20 when transmitted at a relatively low power level.

FIG. 21 illustrates the same analog image of FIG. 20 when transmitted at a relatively low power level. As is evident from FIG. 21, the logo image is very noisy because of the low signal-to-noise ratios that result from low power transmission of the image. However, if one were to view a time lapse capture of this image being transmitted repeatedly and integrated at the receiver, it would be evident that over time this integration process cancels out the noise which is present in the detected polarization or coherence states and the image would come into focus.

Figure 22:
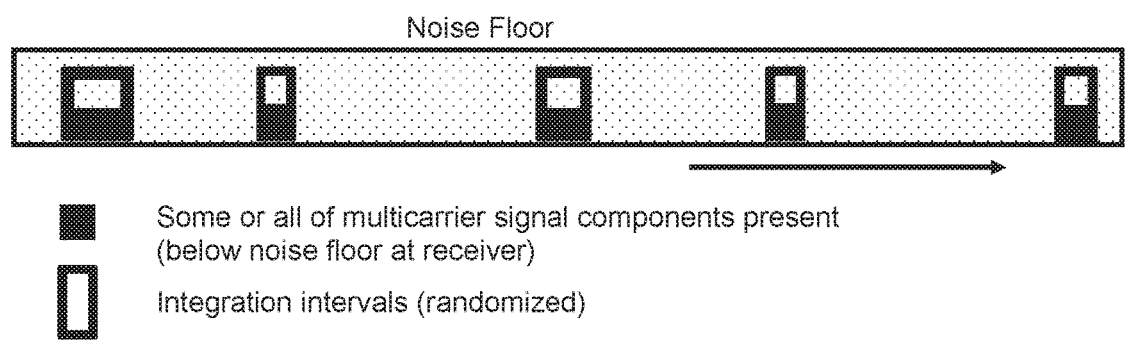
FIG. 22 is a diagram which illustrates how integration of relatively low-power data symbols over time can result in a transmission strategy for low probability of interception.

FIG. 22 is a diagram which illustrates how integration of relatively low-power data symbols over time can result in a transmission strategy for low probability of interception. The transmitter 410 can transmit a particular data symbol at times indicated by the dark rectangles on the diagram. These times can be randomized, but they are known by the intended receiver 420. Further, as indicated by the shaded rectangles on the diagram, some or all of the multi carrier signal components of the data symbol may be transmitted at power levels that fall below the noise floor of the receiver. Notwithstanding the fact that transmission of the data symbol occurs below the noise floor of the receiver, the receiver can recover the data symbol by performing integration of the transmitted data symbols at the appropriate times indicated by the dark rectangles. Over time, this integration process will overcome the noise and allow the data symbol to rise above the noise floor of the receiver. Meanwhile, another receiver which is not the intended recipient will be unable to recover the data symbol—even if it attempts to do so by integration—because it lacks knowledge of the proper integration intervals indicated by the dark rectangles.

Analog Transmission with Built-in Error Correction

Figure 23A:
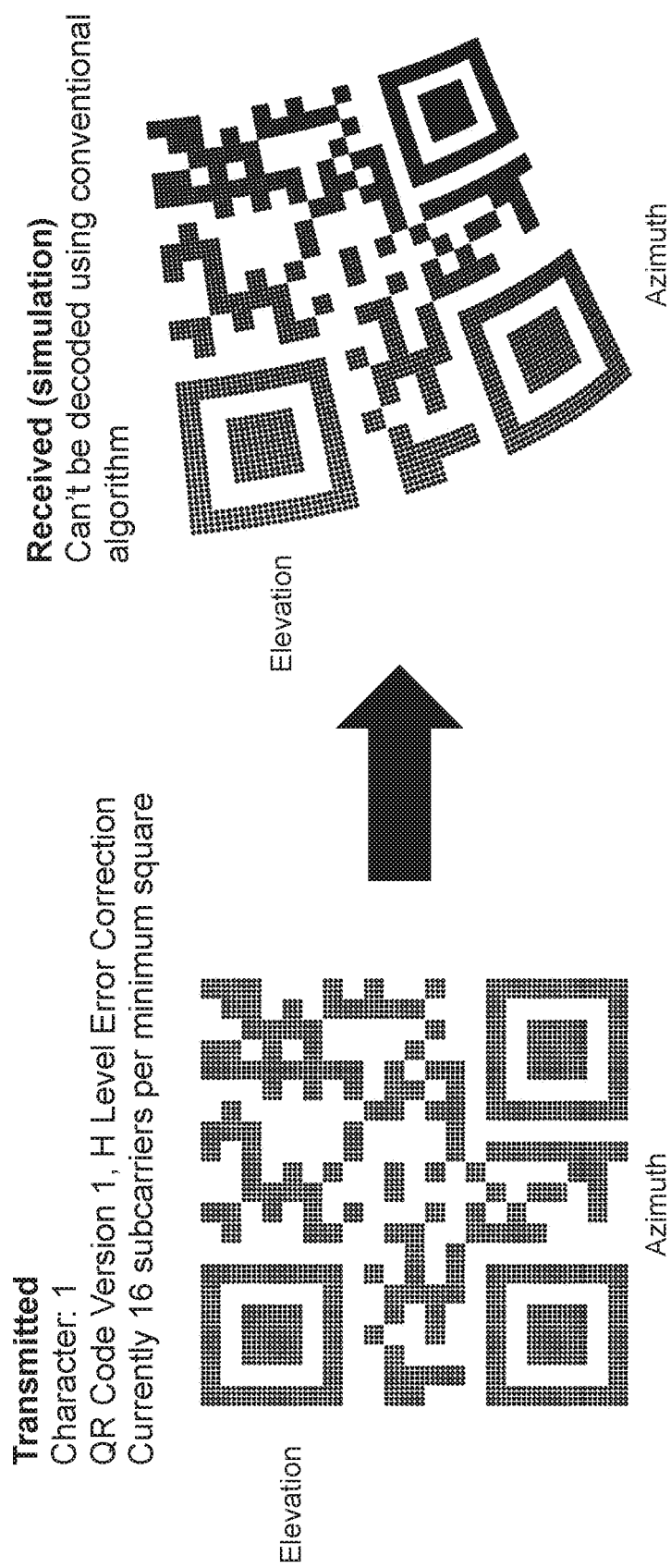
FIGS. 23A and 23B illustrate an example of analog transmission with built-in forward error correction.
Figure 23B:
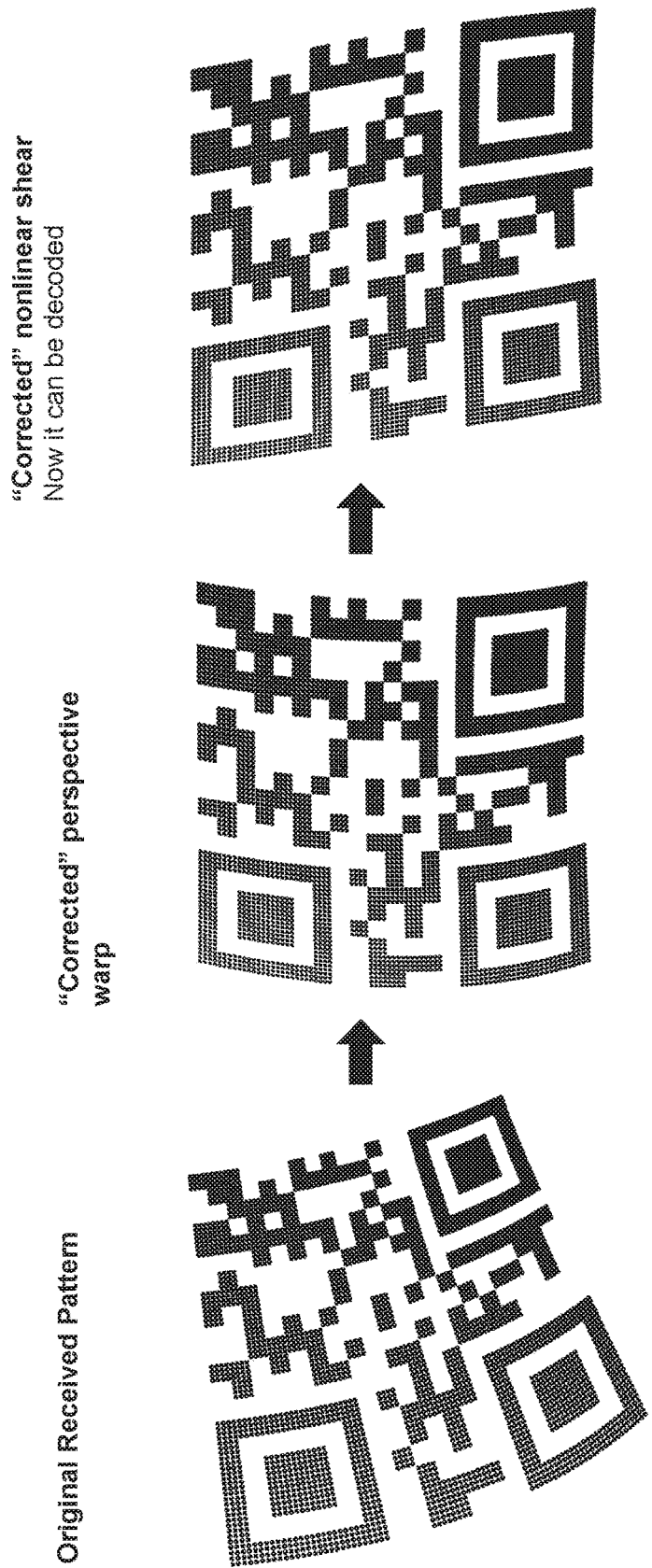

FIGS. 23A and 23B illustrate an example of analog transmission with built-in forward error correction. In FIG. 23A, the analog image being transmitted is a QR code. QR codes are a type of two-dimensional barcode which can be encoded with information, where different levels of forward error correction can be used to generate the QR code. Hence, the QR image inherently includes built-in redundancy, allowing for forward error correction in an analog modulation.

The analog QR code image in the left-hand frame of FIG. 23A can be transmitted using the procedure discussed above with respect to FIG. 20. Namely, the pixels of the QR code can be mapped to analog elevation and azimuth coordinates on a spherical manifold corresponding to a selected pair of transmit signals. These coordinates can then be used to modulate the polarization or coherence states of the frequency sub-bands of the transmit signals. The receiver can recover the analog QR code image by calculating the polarization or coherence state of each of the frequency sub-bands of the received signals.

As shown in right-hand frame of FIG. 23A, however, the recovered analog image of the QR code may be distorted by channel effects. If the distortion is too significant to allow for decoding of the information encoded in the QR code, then image processing algorithms can be performed in order to recover the original transmitted QR code image. This image processing can compensate for channel distortion of the QR scan code—this is in place of conventional channel estimation techniques that rely on transmission of a preamble such as an OFDM symbol. As illustrated in FIG. 23B, in the case of QR codes, such image processing algorithms could include a perspective warp operation (as shown in the middle frame of FIG. 23B) and a nonlinear sheer operation (as shown in the right-hand frame of FIG. 23B). In general, however, the types of image processing algorithms which are employed to correct a distorted analog image may be chosen based on the channel distortion effects which are present in a given channel. In some cases, the analog image may include calibration features (such as the nested squares in the corners of the illustrated QR code) which can be used to correct a distorted analog image. Such calibration features may have known characteristics (e.g., shapes, patterns, etc.) which the receiver can use to correct distortions in the image as a whole.

This example in FIGS. 23A and 23B has illustrated how forward error correction, which is typically only possible with digital modulation schemes, can be made available in analog communications as well.

Digital Modulation in Frequency-Selective Channels

Digital modulation in narrowband AWGN and Rayleigh fading channels have already been discussed for the case of polarization, where polarization-modulations were considered with and without channel state information, and where the receiver uses CSI for adaptive determination of decision boundaries. These techniques can be generalized also to CSD transmissions, where the relative amplitude and phase between arbitrary antennas (or beams) is considered.

The discussion will now turn to multicarrier modulation techniques involving polarization modulation (or coherent signal modulation) of multiple carrier tones comprising a transmitted signal. In one embodiment, baseband tones are generated and modulated and then up-converted to the desired carrier frequency. The tones can be generated through the use of an orthogonal frequency division multiplexing construct, where virtual subcarriers are not used, and where root signals are loaded into the data sub-bands of the V signal, where the root signals can be different from subcarrier to subcarrier, but where the V root signals and H root signals are identical at any subcarrier. The root signals can be arbitrary, but typically will have identical amplitudes but different phases. Then complex modulation factors are applied to each sub-band of the V signal and the H signal to define the polarization (or CSD state) in a manner such that the relative amplitude and the relative phase are controlled to achieve the desired polarization (or CSD) modulation for the given sub-band frequency. The resulting OFDM symbol is inverse FFT'd in order to generate a time-domain signal for the V channel and for the H channel that can then be up-converted to a carrier frequency and amplified and transmitted through the respected transmit antennas (or beams). In some embodiments, a cyclic prefix (or postfix) is applied to counter multipath effects and mitigate intersymbol interference, and to make symbol synchronization less exacting. Furthermore, in some embodiments additional processing can be applied to reduce the peak-to-average power ratio of the time-domain signal. Such reductions can permit the transmitter to operate closer to amplifier saturation (although still in the linear region), enabling more efficient operation. PAPR reduction is discussed in a later section. The signal is then transmitted via the antennas through the propagation channel to the receiver antennas. The propagation channel can include multipath, which as we have discussed, will modify the polarization (and CSD) states of the received signal, and will do so in a manner such that the received states vary with frequency, producing a dispersion of the states.

If the channel state is known to the transmitter, the transmitter can use the channel state information to transmit polarization (or CSD) states versus frequency sub-band to achieve a desired state at the receiver. This can be used to advantage to make choices on optimal constellations and power allocations to the transmitted symbols as we have already discussed for the narrowband polarization case, and perhaps other signaling parameters and communications methods such as interleaving and coding.

In the absence of channel state information at the transmitter, the transmitter will typically transmit a signal constellation such as a binary state modulation, or higher order modulations. In the case of polarization, one embodiment is binary polarization shift keying for a two-state modulation. Because the channel distorts the constellation at the receiver, channel equalization can be performed. However, since the power levels of the two states will, in general be different, adaptive adjustment of the decision boundary can be made to improve the communications performance. An alternative approach that has already been discussed does not apply equalization, but instead computes adaptive boundaries based on the CSI and statistics of the received signals. The CSI requires the transmission of a preamble and/or pilots to equalize the channel and/or adaptively compute the decision boundaries. In some embodiments, CSI may not be available, for example if a preamble or pilots are not transmitted. In such a case, the use of differential modulations can be employed. Differential polarization modulations and/or differential CSD modulations refer to modulations in which the differences between the signal states are used to convey information. The information can be conveyed many ways. For example, state differences between subcarriers on the same manifold can be used; state differences between subcarriers on different manifolds can be used; state differences between the same subcarrier from different multicarrier symbols can be used; or generally differences between any polarization or CSD states and between any two subcarriers, and between the same or any two multicarrier symbols. These represent examples of differential modulation techniques that can be applied, and other techniques may exist.

Peak-to-Average Power Ratio

High Peak-to-Average Power Ratio (PAPR) is a problem often encountered when using multi-carrier modulation schemes such as OFDM modulation. High PAPR results from the nature of these modulation schemes because they result in sinusoids at multiple subcarriers being added together. These sinusoids will experience constructive interference at times and destructive interference at others. Although the average of the sum of these sinusoids may be relatively low, the peak magnitude can be large when many sinusoids happen to add constructively. These peak magnitudes can strain the power amplifiers in the transmitter 410. High PAPR signals would require a large range of dynamic linearity from the amplifiers, which usually results in expensive devices, higher power consumption, and lower efficiency. Generally, a small PAPR is desirable so that the system can operate at high powers (closer to saturation) while operating in the approximately linear response region.

Coherent techniques provide a means to help control peak to average power ratios through the use of phase codes applied across subcarriers. An identical phase code is used on all transmitted signals, and the phase code must be determined for each symbol (such as an OFDM symbol). More specifically, the root signal used in the subcarriers of the polarization or CSD signals can be modified with a randomized phase code to reduce the PAPR of the resulting two time domain signals. One method for accomplishing this for an N-length OFDM symbol is to perform an element-by-element multiplication with any column of a Hadamaard matrix. Each column represents a different binary phase code sequence. A reduced PAPR can be achieved by testing a large number of phase codes, and determining the phase code that provides a low PAPR for both coherent signal channels that are to be transmitted. Up to N codes can be attempted using the columns of the Hadamaard matrix. Of course, the number of phase codes that can be considered can be very, very large and does not have to be restricted to binary phase codes. Quaternary codes can be employed, and even random phase codes can be applied.

A beneficial feature of this approach is that, due to coherent processing at the receiver, any arbitrary code can be simultaneously applied at the transmitter, and the receiver does not need any side information. Moreover, no additional processing at the receiver is required to accommodate this PAPR technique. It also does not impact error rates or induce bandwidth expansion or change the power associated with the subcarriers. The burden is with the transmitter to compute an appropriate phase code for each multicarrier symbol to achieve a low PAPR on each of the coherent signal channels.

Although the discussion herein generally refers to RF signals to make the measurements described herein, it should be understood that the concepts can equally apply to other types of signals, including signals carried by various types of electromagnetic radiation such as infrared or visible light signals, ultraviolet signals, or x-ray signals. In addition, the concepts described herein can apply to transmission lines or to signals carried by other types of wave phenomena besides electromagnetism, such as acoustic signals, etc. Furthermore, in place of, or in addition to antennas to measure the electric field, alternative sensors could be employed to measure the magnetic field. Thus, the systems described herein can be adapted to operate using different types of signals.

Embodiments have been described in connection with the accompanying drawings. However, it should be understood that the figures are not drawn to scale. Distances, angles, etc. are merely illustrative and do not necessarily bear an exact relationship to actual dimensions and layout of the devices illustrated. In addition, the foregoing embodiments have been described at a level of detail to allow one of ordinary skill in the art to make and use the devices, systems, etc. described herein. A wide variety of variation is possible. Components, elements, and/or steps may be altered, added, removed, or rearranged. While certain embodiments have been explicitly described, other embodiments will become apparent to those of ordinary skill in the art based on this disclosure.

The systems and methods described herein can advantageously be implemented using, for example, computer software, hardware, firmware, or any combination of software, hardware, and firmware. Software modules can comprise computer executable code for performing the functions described herein. In some embodiments, computer-executable code is executed by one or more general purpose computers. However, a skilled artisan will appreciate, in light of this disclosure, that any module that can be implemented using software to be executed on a general purpose computer can also be implemented using a different combination of hardware, software, or firmware. For example, such a module can be implemented completely in hardware using a combination of integrated circuits. Alternatively or additionally, such a module can be implemented completely or partially using specialized computers designed to perform the particular functions described herein rather than by general purpose computers. In addition, where methods are described that are, or could be, at least in part carried out by computer software, it should be understood that such methods can be provided on computer-readable media (e.g., optical disks such as CDs or DVDs, hard disk drives, flash memories, diskettes, or the like) that, when read by a computer or other processing device, cause it to carry out the method.

A skilled artisan will also appreciate, in light of this disclosure, that multiple distributed computing devices can be substituted for any one computing device illustrated herein. In such distributed embodiments, the functions of the one computing device are distributed such that some functions are performed on each of the distributed computing devices.

While certain embodiments have been explicitly described, other embodiments will become apparent to those of ordinary skill in the art based on this disclosure, Therefore, the scope of the invention is intended to be defined by reference to the claims and not simply with regard to the explicitly described embodiments.

What is claimed is:

1. A method for transmitting data to a receiver using an analog modulation scheme, the method comprising:
   mapping pixels of image data to analog coordinates on a manifold corresponding to a pair of signals;
   modulating polarization or coherence states of a plurality of frequency sub-bands for the pair of signals based on the analog coordinates; and
   transmitting the pair of signals to a receiver.

2. The method of claim 1, wherein the image data comprises forward error correction data.

* * * * *